United States Patent
Ono et al.

(10) Patent No.: US 10,210,132 B2
(45) Date of Patent: Feb. 19, 2019

(54) CALCULATOR, RECORDING MEDIUM AND COMPUTE SERVER

(71) Applicant: CASIO COMPUTER CO., LTD., Shibuya-ku, Tokyo (JP)

(72) Inventors: Manato Ono, Wako (JP); Saburo Kamitani, Kokubunji (JP); Hiroaki Yoshizawa, Ome (JP); Hiroshi Uejima, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 238 days.

(21) Appl. No.: 14/856,478

(22) Filed: Sep. 16, 2015

(65) Prior Publication Data
US 2016/0085717 A1 Mar. 24, 2016

(30) Foreign Application Priority Data

Sep. 19, 2014 (JP) ................. 2014-191868
Sep. 19, 2014 (JP) ................. 2014-191879
Nov. 21, 2014 (JP) ................. 2014-236135
Nov. 26, 2014 (JP) ................. 2014-239295

(51) Int. Cl.
*G06F 17/16* (2006.01)
*G06F 15/02* (2006.01)

(52) U.S. Cl.
CPC .......... *G06F 15/0225* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 4,001,569 | A | 1/1977 | Dickinson et al. |
| 4,764,120 | A | 8/1988 | Griffin et al. |
| 4,963,097 | A | 10/1990 | Anju |
| 5,189,633 | A | 2/1993 | Bonadio |
| 6,302,698 | B1 | 10/2001 | Ziv-El |
| 6,750,864 | B1 | 6/2004 | Anwar |
| 8,789,197 | B1 | 7/2014 | Wolfram et al. |
| 2002/0115050 | A1 | 8/2002 | Roschelle et al. |
| 2004/0072136 | A1 | 4/2004 | Roschelle et al. |
| 2005/0101314 | A1 | 5/2005 | Levi |

(Continued)

FOREIGN PATENT DOCUMENTS

| | | |
|---|---|---|
| CN | 102831163 A | 12/2012 |
| JP | 09128366 A | 5/1997 |

(Continued)

OTHER PUBLICATIONS

U.S. Appl. No. 14/855,084; First Named Inventor: Hiroaki Yoshizawa; Title: "Server Apparatus, Data Aggregation Method, and Communication Device"; filed Sep. 15, 2015.

(Continued)

*Primary Examiner* — Michael D. Yaary
(74) *Attorney, Agent, or Firm* — Holtz, Holtz & Volek PC

(57) ABSTRACT

A calculator includes an input unit and a processor. The processor is configured to perform following processes: receiving a selection of a calculation function type according to a user's operation; receiving an input of calculation object data according to the selected calculation function type, according to a user's operation; and outputting at least one of the calculation object data and calculation result data obtained by a calculation based on the input calculation object data, as external data.

7 Claims, 21 Drawing Sheets

(56) References Cited

U.S. PATENT DOCUMENTS

| | | | |
|---|---|---|---|
| 2006/0183100 | A1 | 8/2006 | Voehl et al. |
| 2007/0050432 | A1 | 3/2007 | Yoshizawa |
| 2007/0165860 | A1 | 7/2007 | Handa et al. |
| 2008/0003559 | A1 | 1/2008 | Toyama et al. |
| 2008/0104691 | A1 | 5/2008 | Takeda et al. |
| 2009/0066689 | A1 | 3/2009 | Yamaguchi et al. |
| 2009/0240751 | A1 | 9/2009 | Renshaw et al. |
| 2009/0254597 | A1 | 10/2009 | Karoji |
| 2010/0227304 | A1 | 9/2010 | Horikawa et al. |
| 2011/0254862 | A1 | 10/2011 | Okano |
| 2012/0251997 | A1 | 10/2012 | Kojo |
| 2013/0026239 | A1 | 1/2013 | Sakahashi et al. |
| 2013/0050064 | A1 | 2/2013 | Okano |
| 2013/0082100 | A1 | 4/2013 | Stavrou et al. |
| 2013/0209982 | A1 | 8/2013 | Rooks et al. |
| 2013/0309648 | A1 | 11/2013 | Park et al. |
| 2014/0009496 | A1 | 1/2014 | Chapman et al. |
| 2014/0342341 | A1 | 11/2014 | Rea |
| 2014/0356838 | A1 | 12/2014 | Freimuth et al. |
| 2016/0085716 | A1 | 3/2016 | Yoshizawa et al. |
| 2016/0085845 | A1 | 3/2016 | Yoshizawa |
| 2016/0086362 | A1 | 3/2016 | Suzuki |
| 2016/0086512 | A1 | 3/2016 | Yoshizawa |
| 2016/0086513 | A1 | 3/2016 | Uejima et al. |

FOREIGN PATENT DOCUMENTS

| | | | |
|---|---|---|---|
| JP | 10171786 | A | 6/1998 |
| JP | 2004206405 | A | 7/2004 |
| JP | 2005322962 | A | 11/2005 |
| JP | 2006099256 | A | 4/2006 |
| JP | 2006125871 | A | 5/2006 |
| JP | 2006309619 | A | 11/2006 |
| JP | 2007304656 | A | 11/2007 |
| JP | 2009049948 | A | 3/2009 |
| JP | 2009053848 | A | 3/2009 |
| JP | 2009087047 | A | 4/2009 |
| JP | 2010129075 | A | 6/2010 |
| JP | 2010237999 | A | 10/2010 |
| JP | 2011076540 | A | 4/2011 |
| JP | 2011081301 | A | 4/2011 |
| JP | 2011097287 | A | 5/2011 |
| JP | 4720607 | B2 | 7/2011 |
| JP | 2011155534 | A | 8/2011 |
| JP | 2011204003 | A | 10/2011 |
| JP | 2012248013 | A | 12/2012 |
| JP | 2013025501 | A | 2/2013 |
| JP | 2013050746 | A | 3/2013 |
| JP | 2013073325 | A | 4/2013 |
| JP | 2013134740 | A | 7/2013 |
| JP | 2014023280 | A | 2/2014 |
| JP | 2014211836 | A | 11/2014 |
| WO | 2009107245 | A1 | 9/2009 |
| WO | 2012111559 | A1 | 8/2012 |

OTHER PUBLICATIONS

U.S. Appl. No. 14/855,122; First Named Inventor: Miki Suzuki; Title: "Electronic Device, Data Output Method in Electronic Device, and Server Device"; filed Sep. 15, 2015.

U.S. Appl. No. 14/855,159; First Named Inventor: Hiroaki Yoshizawa; Title: "Server Apparatus, Method of Aggregating Calculation Target Data, and Storage Medium Storing Calculation Data Aggregation Program"; filed Sep. 15, 2015.

U.S. Appl. No. 14/855,921; First Named Inventor: Hiroaki Yoshizawa; Title: "Expression Processing Device, Compute Server and Recording Medium Having Expression Processing Program Recorded Thereon"; filed Sep. 16, 2015.

U.S. Appl. No. 14/856,031; First Named Inventor: Hiroshi Uejima; Title: "Server Apparatus, Data Integration Method and Electronic Device"; filed Sep. 16, 2015.

Togawa, et al., "Derive, Low-Price, Functionally-Rich Formula-Processing System Operating on MS-DOS", Nikkei Byte, Japan, Nikkei BP, Apr. 1, 1989, No. 57, pp. 265-269.

Watanabe, et al., "An Implementation of Graph Web Service and Its Application on Mathematical Education", Technical Research Report of The Institute of Electronics, Information and Communication Engineers, Japan, Jul. 18, 2005, vol. 105, No. 207, pp. 13-17.

Japanese Office Action (and English translation thereof) dated May 30, 2017 issued in counterpart Japanese Application No. 2014-236135.

Japanese Office Action (and English translation thereof) dated Jul. 4, 2017 issued in counterpart Japanese Application No. 2014-191879.

Japanese Office Action (and English translation thereof) dated May 30, 2017 issued in counterpart Japanese Application No. 2014-236083.

Japanese Office Action (and English translation thereof) dated Jun. 6, 2017 in counterpart Japanese Application No. 2014-239297.

Japanese Office Action (and English translation thereof) dated Jul. 5, 2016, issued in counterpart Japanese Application No. 2014-239295.

Extended European Search Report (EESR) dated Dec. 14, 2017 issued in counterpart European Application No. 15185883.4.

Yang, et al., "iMathema", Innovative Computing and Cloud Computing, ACM, 2 Penn Plaza, Suite 701, New York, NY 10121-0701 USA, Dec. 1, 2013, pp. 16-17.

Japanese Office Action dated Nov. 28, 2017 issued in Japanese Application No. 2014-236083.

Japanese Office Action dated Oct. 10, 2017 issued in Japanese Application No. 2016-179499.

Ito, et al., "Emulation of Graph Calculator with Image Input—Mounting on Cellular Phone", FIT2007 (6th Forum of Information Technology), General lecture collected papers.

Japanese Office Action dated Mar. 13, 2018 issued in counterpart Japanese Application No. 2014-191868.

"Systems of Linear Equations", retrieved from internet: <https://www.bigideasmath.com/protected/content/ipe/grade/0208/02/g8_02_05.pdf>.

(CONT.)

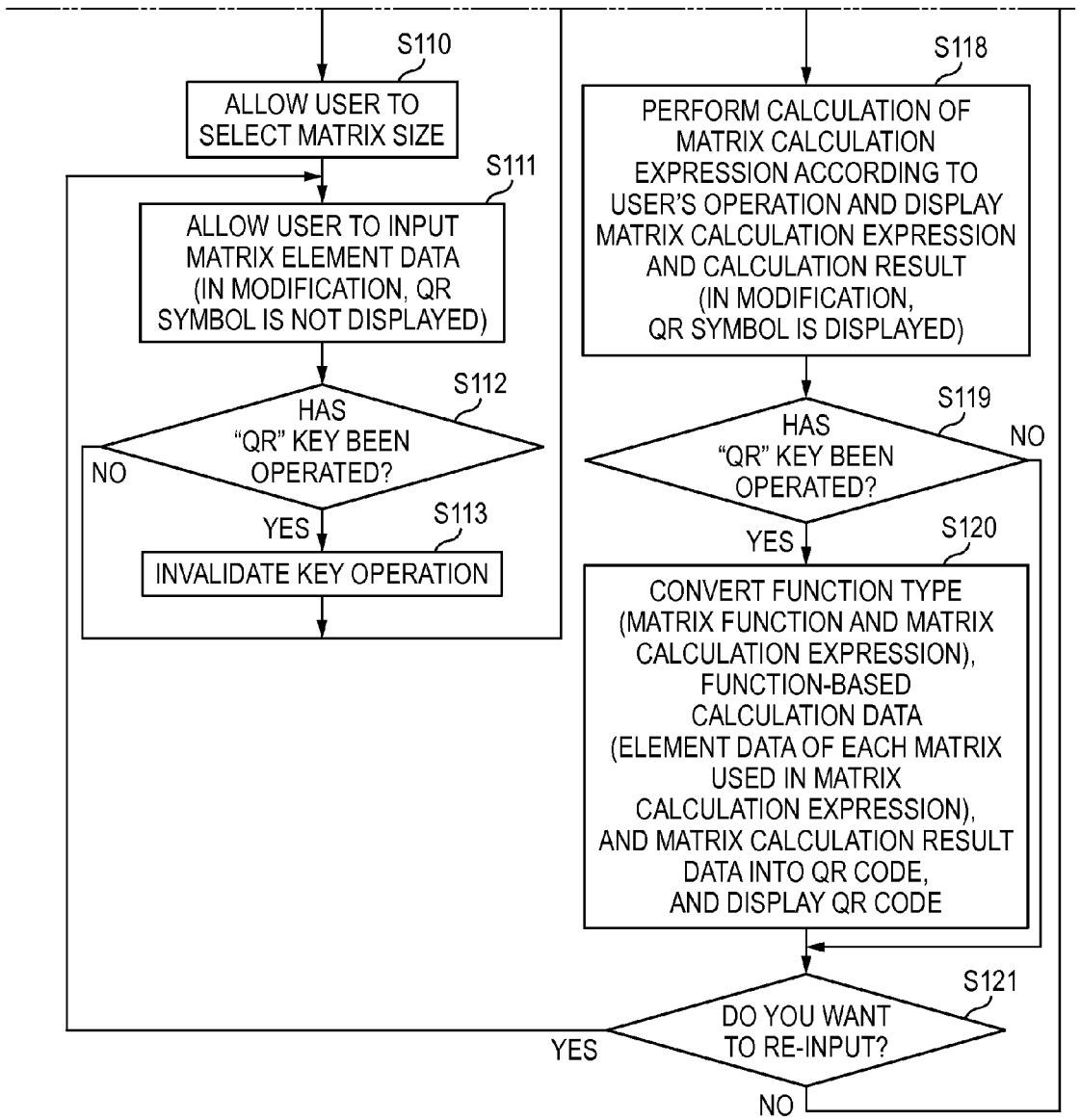

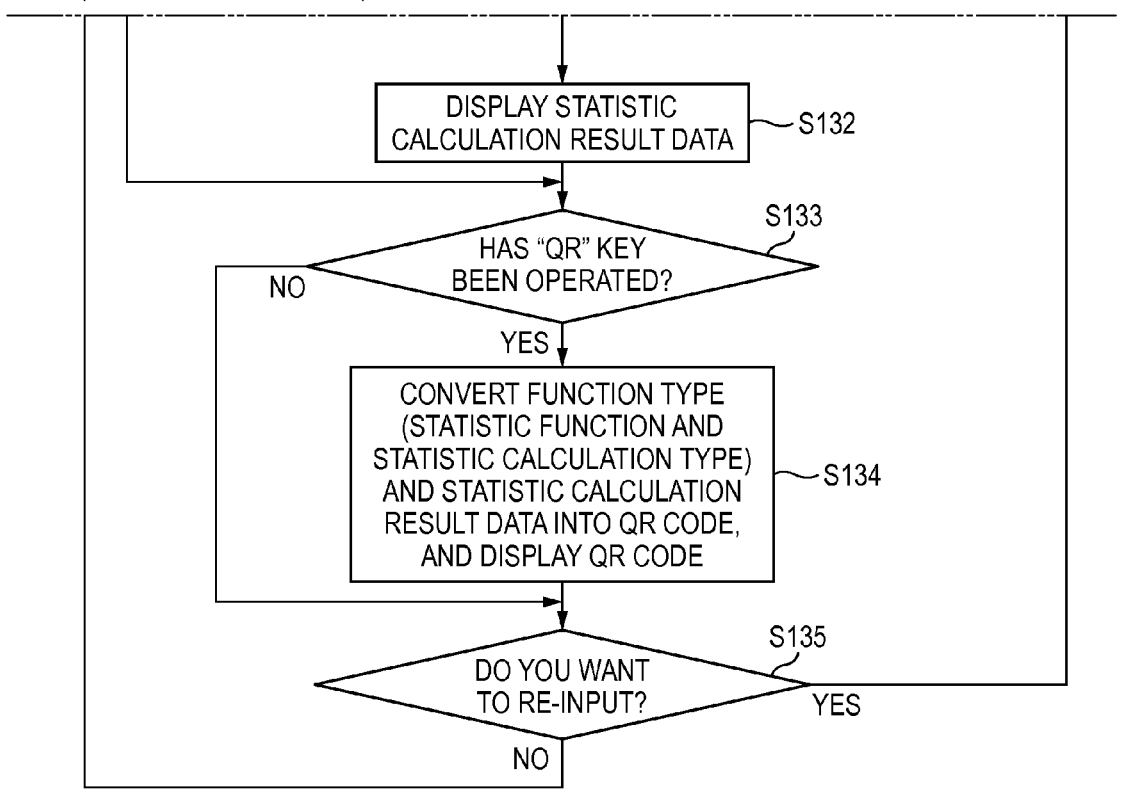

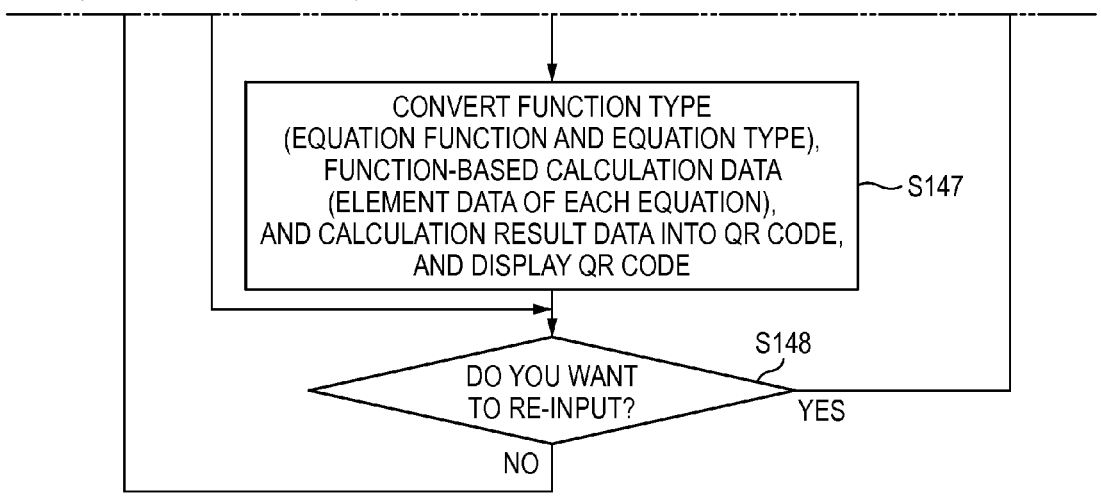

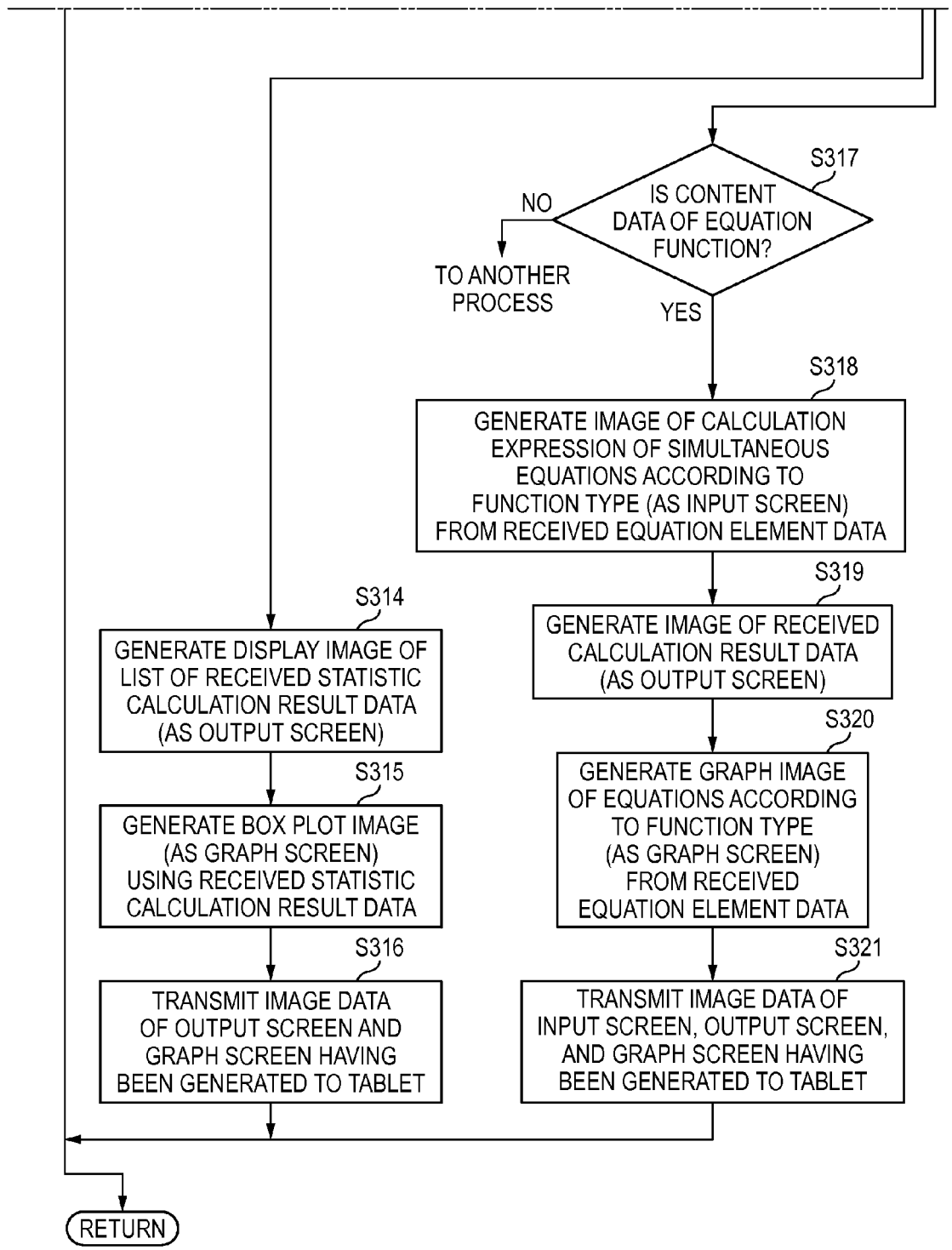

FIG. 10

(A) SELECT "MATRIX MODE"

```
1: 1-VAR    2: A+BX
3: _+CX²    4: ln X
5: e^X      6: A·B^X
7: A·X^B    8: 1/X
```
— Mc
— 12

(B) OPERATE "QR" KEY (DISPLAY DOES NOT CHANGE)

(C) SELECT "1" (ONE-VARIABLE STATISTIC) AND INPUT SAMPLE DATA

```
  x  D
5  32
6  29
7  12
8   1      1
```
— Gc (D) OPERATE "QR" KEY

[QR code] — 12
Q (E) [Tablet device with QR code on screen] — 20, 21
Q (G) BAR CHART — Bo PIE CHART — Ci
23.26%
26.47%
2.45%
16.42%
31.37%

(F)
Graph
[box plot] — Hi
0 10 20 30 40 50
PL
▼ — Gg

Table
| | x |
|---|---|
| 1 | 1 |
| 2 | 12 |
| 3 | 34 |
| 4 | 43 |
| 5 | 32 |
| 6 | 29 |
| 7 | 12 |
| 8 | 1 |
— T
— Gt

FIG. 13

(A) SELECT EQUATION MODE

```
1: anX + bnY = cn
2: anX + bnY + CnZ = dn
3: aX² + bX + c = 0
4: aX³ + bX² + cX + d = 0
```
— Md, 12

(B) OPERATE "QR" KEY (DISPLAY DOES NOT CHANGE)

(C) SELECT "1" (FOR SIMULTANEOUS EQUATIONS WITH TWO VARIABLES)

$$\begin{cases} a_1 & b_1 & c_1 \\ \boxed{0}\,x+ & y= & \\ x+ & y= & \\ a_2 & b_2 & c_2\ 0 \end{cases}$$
— Gd (D) OPERATE "QR" KEY (DISPLAY DOES NOT CHANGE)

(E) INPUT COEFFICIENT DATA $$\begin{cases} a_1 & b_1 & c_1 \\ x+ & y= & 3 \\ x+ & 2\,y= & \boxed{4} \\ a_2 & b_2 & c_2\ 4 \end{cases}$$
— Gd (F) OPERATE "QR" KEY (DISPLAY DOES NOT CHANGE)

(G) OPERATE "=" KEY, THEREBY PERFORMING CALCULATION

X = 
  2
— GX (H) OPERATE "QR" KEY

[QR code] — Q (I) PERFORM RETURNING BY "QR" KEY AND OPERATE "=" KEY, THEREBY PERFORMING CALCULATION

Y = 
  1
— GY (J) OPERATE "QR" KEY

[QR code Q] — 12

(K) 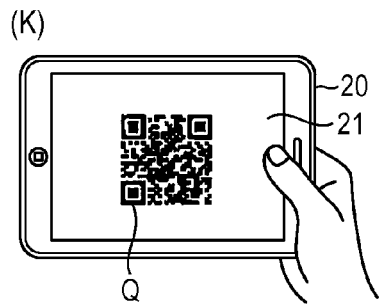
— 20, 21

CALCULATOR, RECORDING MEDIUM AND COMPUTE SERVER

CROSS-REFERENCE TO RELATED APPLICATIONS

The present application claims the priority of Japanese Patent Application Nos. 2014-191868 filed on Sep. 19, 2014, 2014-191879 filed on Sep. 19, 2014, 2014-236135 filed on Nov. 21, 2014, and 2014-239295 filed on Nov. 26, 2014, the contents of which being here incorporated for reference.

BACKGROUND OF THE INVENTION

Field of the Invention

The present invention relates to a calculator, a recording medium, a compute server, and the like appropriate for performing various calculations.

Description of the Related Art

In the related art, information display devices which have various types of calculation functions and are called scientific calculators are widely used.

These information display devices can perform calculation functions such as the four basic arithmetic operations, a matrix calculation function, a statistic calculation function, and an equation calculation function. If a user selects an operating mode for a desired type of computing function and inputs a calculation expression to be a calculation object and numerical values according to the selected type of computing function, such an information display device performs a calculation, and displays the calculation result.

Further, an advantage of the information display devices which are scientific calculators is that they are easy to carry such that users can simply perform desired types of calculations, thereby obtaining the calculation results.

Therefore, in order to interpret or analyze the calculation process of a calculation performed by such an information display device, and the result of the calculation, a separate calculator having a function for the corresponding interpretation or analysis needs to be used, and the corresponding separate calculator needs to reproduce the same calculation process and a state where data on the calculation result has been obtained.

In JP-A-2011-076540, as a method of making a plurality of information devices share common data without a communication function, there has been proposed a technology in which one device displays a QR code (a trademark) corresponding to input text data on one device, and another device photographs the displayed QR code by a camera, and converts the QR code into the original text data, and displays the original text data.

SUMMARY OF THE INVENTION

If the technology proposed in JP-A-2011-076540 is used, it can be considered to convert data on the calculation process and the calculation result of the information display device into a QR code, and supply the QR code to another calculator. However, even though data obtained in the current calculation state is supplied to another calculator, the user cannot obtain desired reference information (such as calculation object data and analysis data thereof) with an appropriate format.

The present invention was made in view of the above described problem, and an object of the present invention is to provide a calculator capable of outputting appropriate data for generating appropriate reference information in an external device such that the external device can acquire the output data, a compute server which acts as the external device, a calculator control program, a server control program, and a calculator system.

A calculator according to the present invention includes an input unit and a processor. The processor is configured to perform following processes: receiving a selection of a calculation function type according to a user's operation; receiving an input of calculation object data according to the selected calculation function type, according to a user's operation; and outputting at least one of the calculation object data and calculation result data obtained by a calculation based on the input calculation object data, as external data.

BRIEF DESCRIPTION OF THE DRAWINGS

FIG. 10 is a view illustrating a display operation according to calculation object element data input according to user's operations in a statistic mode according to the display control process of the scientific calculator 10, and image data of statistic calculation reference information (a first example) generated according to the server process of the compute server 30 based on barcode content data (QR data) output during the corresponding display operation.

FIG. 13 is a view illustrating display operations according to user's operations in an equation mode according to the display control process of the scientific calculator 10.

DETAILED DESCRIPTION OF THE INVENTION

Hereinafter, embodiments of the present invention will be described with reference to the accompanying drawings.

Figure 1:
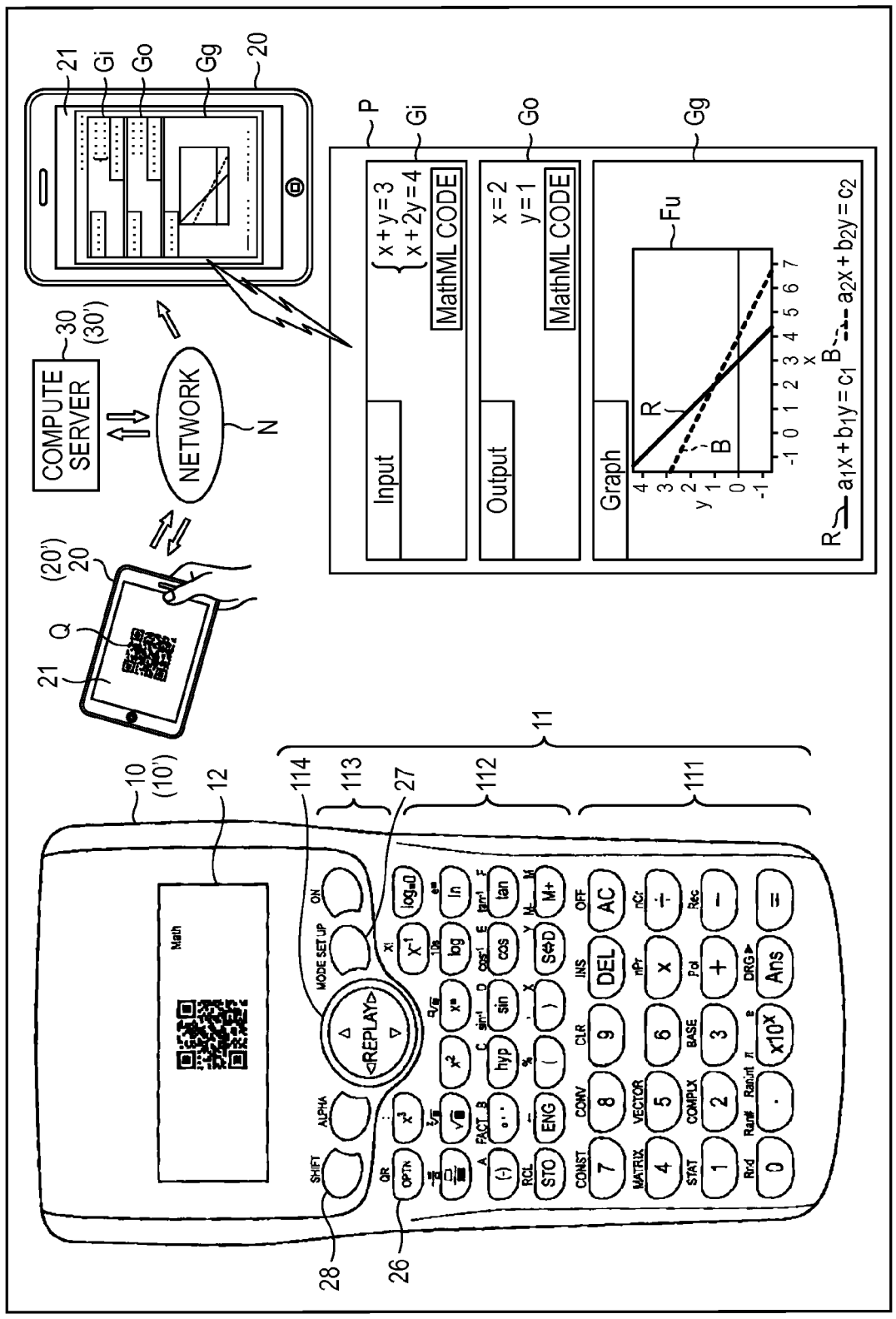
FIG. 1 is a schematic diagram illustrating the configuration of a calculator system according to an embodiment of the present invention.

FIG. 1 is a schematic diagram illustrating the configuration of a calculator system according to a first embodiment of the present invention.

Here, as an example, it will be described a system which is composed of a scientific calculator 10 (a scientific calculator 10') which is an information display device which is used by a student, a communication device 20 (a portable terminal 20') with a camera, such as a tablet PC with a camera, which the corresponding student or a teacher uses to photograph a two-dimensional code such as a QR code (a trademark) displayed on the scientific calculator 10 (the scientific calculator 10'), a compute server 30 (a server 30') which receives calculation function type data and calculation object data according to the content data of the two-dimensional code Q photographed by the communication device 20 (the portable terminal 20') with the camera, from the communication device 20 (the portable terminal 20') through a communication network N such as the Internet, and generates calculation reference information (such as the calculation object data and the analysis result thereof) of an appropriate format according to the calculation function type data and the calculation object data, the communication device 20 (the portable terminal 20') with the camera which receives the calculation reference information generated by the compute server 30 (the server 30'), through the communication network N, and displays the calculation reference information, and a projector P which magnifies and projects the calculation reference information displayed on the corresponding communication device 20, as shown in FIG. 1. Also, the device names in parentheses are device names in a second embodiment.

Further, the communication device 20 (the portable terminal 20') with the camera is not limited to a tablet PC with a camera, and can be configured as a PDA (a personal digital assistant) with a camera, a smart phone with a camera, a laptop (a personal computer) with a camera or connected to a camera, an electronic blackboard, or the like.

Also, FIG. 1 separately shows two communication devices 20 (portable terminals 20') with cameras; however, they are just for showing a transition of a display output unit 21 from when a two-dimensional code is photographed to when calculation reference information is received. Actually, one communication device 20 with the camera is prepared for one student or one teacher. Further, FIG. 1 shows one representative scientific calculator 10 (the scientific calculator 10'); however, actually, the number of scientific calculators which are included in the system is according to the number of students. Also, one scientific calculator 10 for a teacher may be further included.

The scientific calculator 10 (the scientific calculator 10') is configured in a small size due to the necessity of portability such that a user can sufficiently grip it with one hand and operate it with one hand. On the front surface of the main body of the scientific calculator 10, a key input unit 11 and a display output unit 12 are provided.

The key input unit 11 includes a numerical-value/operation-symbol key group 111 for inputting numbers or expressions, or instructing calculation execution, a function key group 112 for inputting various functions or starting a memory function, a mode setting key group 113 for displaying a menu screen of various operating modes or instructing setting of an operating mode, a cursor key 114 for performing an operation to move a cursor displayed on the display output unit 12, an operation to select a data item, etc.

As the numerical-value/operation-symbol key group 111, "0" to "9" (numeric) keys, "+", "−", "×", and "÷" (four basic operation symbols) keys, "Ans" and "=" (execution) keys, "AC" (clear) key, and so on are arranged.

As the function key group 112, an "$x^{-1}$" (x to the negative one power; the reciprocal of x) key, a "$\sqrt{\square}$" (root) key, a "$\square/\square$" (fraction) key, a "sin" (since) key, an "M+" (memory plus) key, a "STO" (memory registration) key, and so on are arranged.

As the mode setting key group 113, a "MODE" (mode) key 27, a "SHIFT" (shift) key, an "ALPHA" (alphabet) key, an "ON" (power-on) key, and so on are arranged.

Also, each key of the number/operation-symbol key group 111 and the function key group 112 is configured so as to be able to act as a key for a function written above the corresponding key, not a function written on the corresponding key, if the corresponding key is operated after the "SHIFT" key is operated. For example, an operation on the "AC" key after an operation on the "SHIFT" key (This will be hereinafter referred to as a "SHIFT"+"AC" key. The same applies hereinafter) becomes an "OFF" (power-off) key. A "SHIFT"+"STO" key becomes an "RCL" (memory list display) key. A "SHIFT"+"OPTN (option)" key becomes a "QR" key 26. Also, the "QR" key 26 may be configured as one independent function key.

The display output unit 12 is composed of a dot matrix type liquid crystal display unit.

Figure 2:
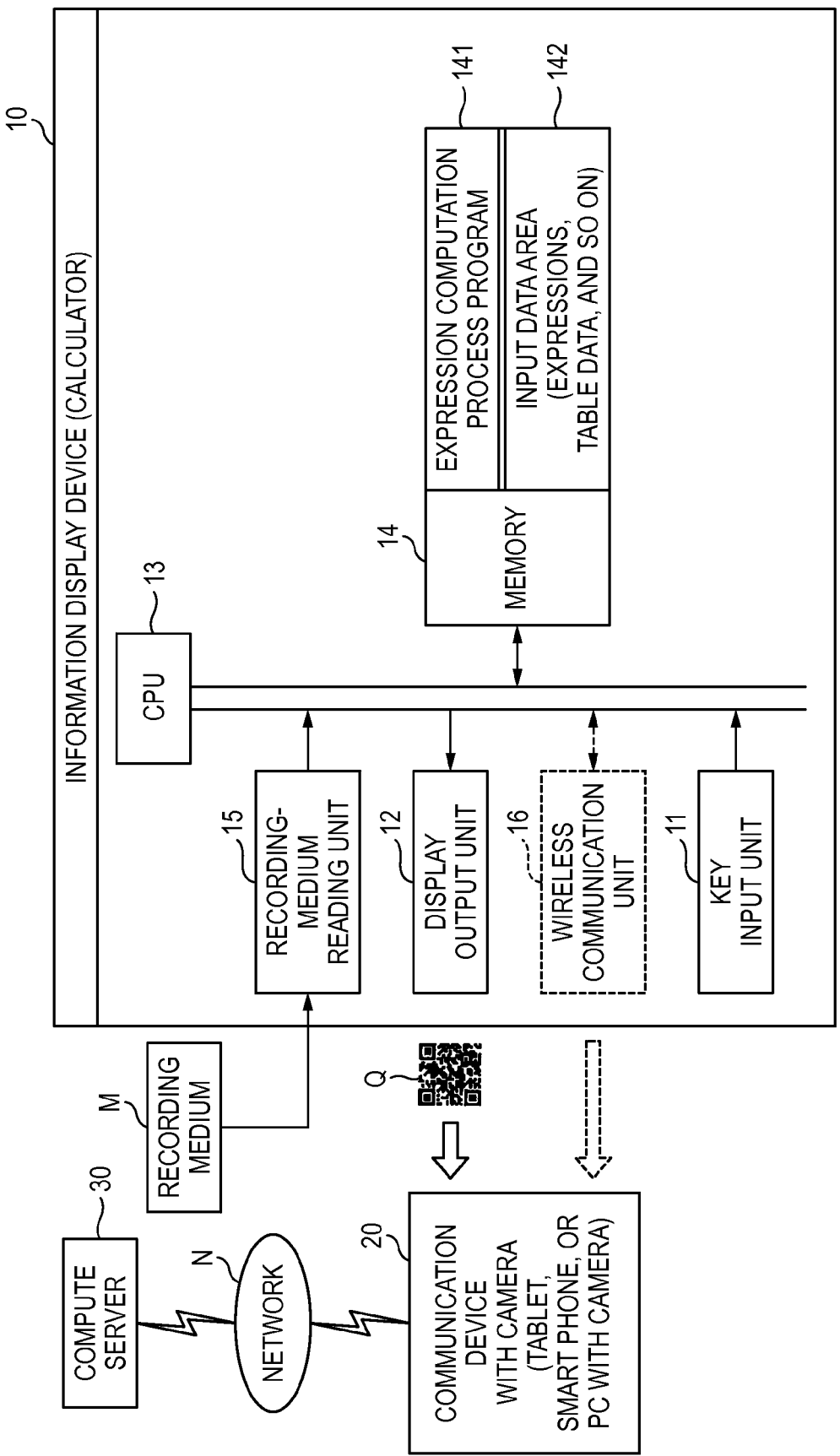
FIG. 2 is a block diagram illustrating the configuration of an electronic circuit of a scientific calculator 10.

FIG. 2 is a block diagram illustrating the configuration of an electronic circuit of the scientific calculator 10.

The electronic circuit of the scientific calculator 10 includes a CPU 13 which is a computer, a memory 14, and a recording-medium reading unit 15, in addition to the key input unit 11 and the display output unit 12. Also, as shown by a broken line in FIG. 2, the electronic circuit may include a wireless communication unit 16.

The CPU 13 controls the operation of each unit of the circuit according to an expression computation process program 141 stored in the memory 14, thereby executing various calculation processes according to key input signals from the key input unit 11. The expression computation process program 141 may be stored in advance in the memory 14, or may be loaded from an external recording medium M such as a memory card into the memory 14 through the recording-medium reading unit 15. The expression computation process program 141 is configured such that a user cannot rewrite the corresponding program by operating the key input unit 11.

In the memory 14, in order to store data which the user can rewrite, besides such information which the user cannot rewrite, an input data area 142 is ensured.

Here, the input data area 142 sequentially receives key code data items input by the keys of the key input unit 11, and stores expression data and table data composed by them. For example, numeric keys are stored as codes representing numbers, and function keys such as the "sin" key are stored as codes representing corresponding functions, and arithmetic symbol keys such as "+", "−", "×", and "÷" keys are stored as codes representing the corresponding arithmetic symbols. Also, in the input data area 142, variables such as different numerical values which are individually registered with respect to nine characters A, B, C, D, E, F, M, X, and Y are stored. For example, if the "3" key, the "STO" key, and the "−" key (= an "A" key) are operated, a numerical value "3" is registered for the variable A. Further, calculation data such as a calculation function type (such as "FOUR-BASIC-OPERATION FUNCTION", "COMPLEX NUMBER CALCULATION FUNCTION", "N-ARY CALCULATION FUNCTION", "MATRIX CALCULATION FUNCTION", "VECTOR CALCULATION FUNCTION", "STATISTIC CALCULATION FUNCTION", "FUNCTION EXPRESSION TABLE CALCULATION FUNCTION", or "EQUATION CALCULATION FUNCTION") set according to an operation on the "MODE" key of the key input unit 11, a calculation type such as a calculation expression according to the calculation function type, and calculation data such as numerical values input as calculation elements, and calculation result data acquired according to calculation performance are stored. Also, the calculation function type and the calculation type according to the calculation function type will be collectively referred to as the "calculation function type", and the calculation data which are calculation elements will be referred to as the "function-based calculation data".

The wireless communication unit 16 has a function of performing wireless communication with an external device such as the communication device 20 with the camera by Bluetooth (a trademark), infrared communication, or the like.

The CPU 13 of the scientific calculator 10 configured as described above controls the operations of the individual units of the circuit according to commands described in the expression computation process program 141 such that software and hardware operate in cooperation with each other, thereby implementing a display control function of converting the calculation function type, function-based calculation data, and calculation result data according to an expression computation process of the scientific calculator 10 into a two-dimensional code (in the present embodiment, a two-dimensional code image (a QR code)) and displaying the two-dimensional code by the display output unit 12, as will be described in the following operation description.

The communication device 20 with the camera photographs the image of the two-dimensional code image (QR code) Q which is output to the display output unit 12 by the CPU 13 and which is displayed on the display output unit 12 of the scientific calculator 10, and transmits the content data (hereinafter, referred to as the "barcode content data (QR data)") of the photographed two-dimensional code image (QR code) to the compute server 30 having an address set in advance, through the communication network N.

Figure 3:
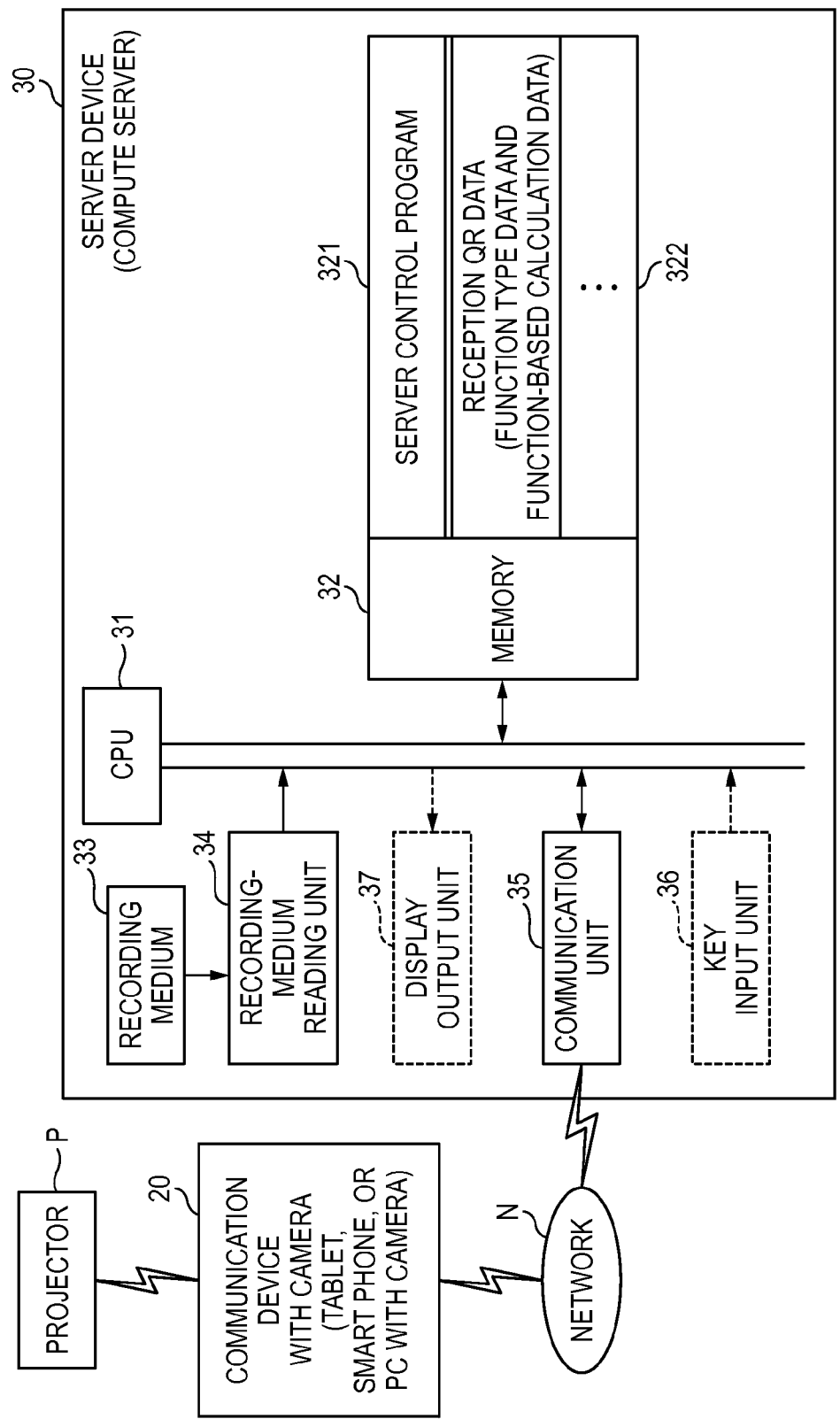
FIG. 3 is a block diagram illustrating the configuration of an electronic circuit of a compute server 30.

FIG. 3 is a block diagram illustrating the configuration of an electronic circuit of the compute server 30.

The electronic circuit of the compute server 30 includes a CPU 31 which is a computer, a memory 32, a recording medium 33, a recording-medium reading unit 34, and a communication unit 35. Also, as shown by broken lines in FIG. 3, the electronic circuit may include a key input unit 36 or a display output unit 37.

The CPU 31 controls the operations of the individual units of the circuit according to a server control program 321 stored in the memory 32, thereby executing various calculation processes according the barcode content data (QR data) received from the communication device 20 with the camera by the communication unit 35. The server control program may be stored in advance in the memory 32, or may be loaded from the recording medium 33 such as a memory card into the memory 32 through the recording-medium reading unit 34, or may be downloaded from a Web server (not shown) on the communication network N into the memory 32 through the communication unit 35.

In the memory 32, the server control program 321 is stored, and a reception QR data memory 322 for storing the barcode content data (QR data) (such as the calculation function type, the function-based calculation data, and the calculation result data) received from the communication device 20 with the camera through the communication unit 35 and primarily holding the barcode content data is ensured.

Also, the server control program 321 has a function of performing a setting operation or a maintenance operation according to a setting operation, a maintenance operation, or the like on the key input unit 36 by an operator of the corresponding compute server 30, a function of displaying the intermediate progress or result of an operation of the server control program on the display output unit 37, and so on.

The CPU 31 of the compute server 30 configured as described above controls the operations of the individual units of the circuit according to commands described in the server control program 321 such that software and hardware operate in cooperation with each other, thereby implementing a server process function of generating calculation reference information (an image) according to the received barcode content data (QR data) (such as the calculation function type, the function-based calculation data, and the calculation result data) and transmitting the calculation reference information image to the communication device 20 with the camera which is the transmission source of the received barcode content data (QR data) and belongs to the student or the teacher, as will be described in the following operation description.

If the communication device 20 with the camera receives the calculation reference information image from the compute server 30 through the communication network N, it can display the calculation reference information image on the display output unit 21, or can magnify and project the calculation result by connecting a projector P to the corresponding communication device 20 with the camera.

Subsequently, an operation of the calculator system having the above described configuration will be described.

Figure 4:
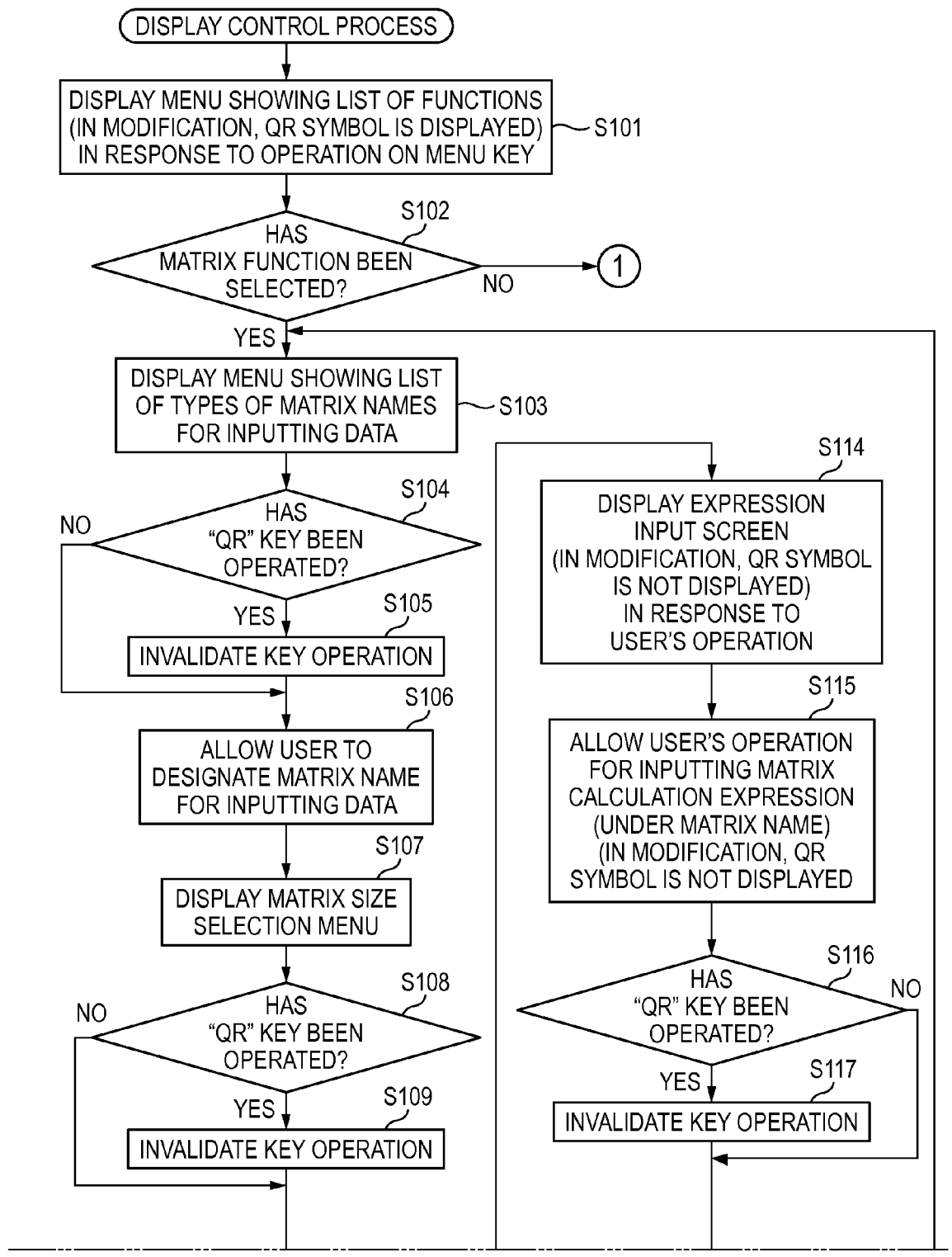
FIG. 4 is a flow chart illustrating a part of a display control process of the scientific calculator 10.
Figure 5:
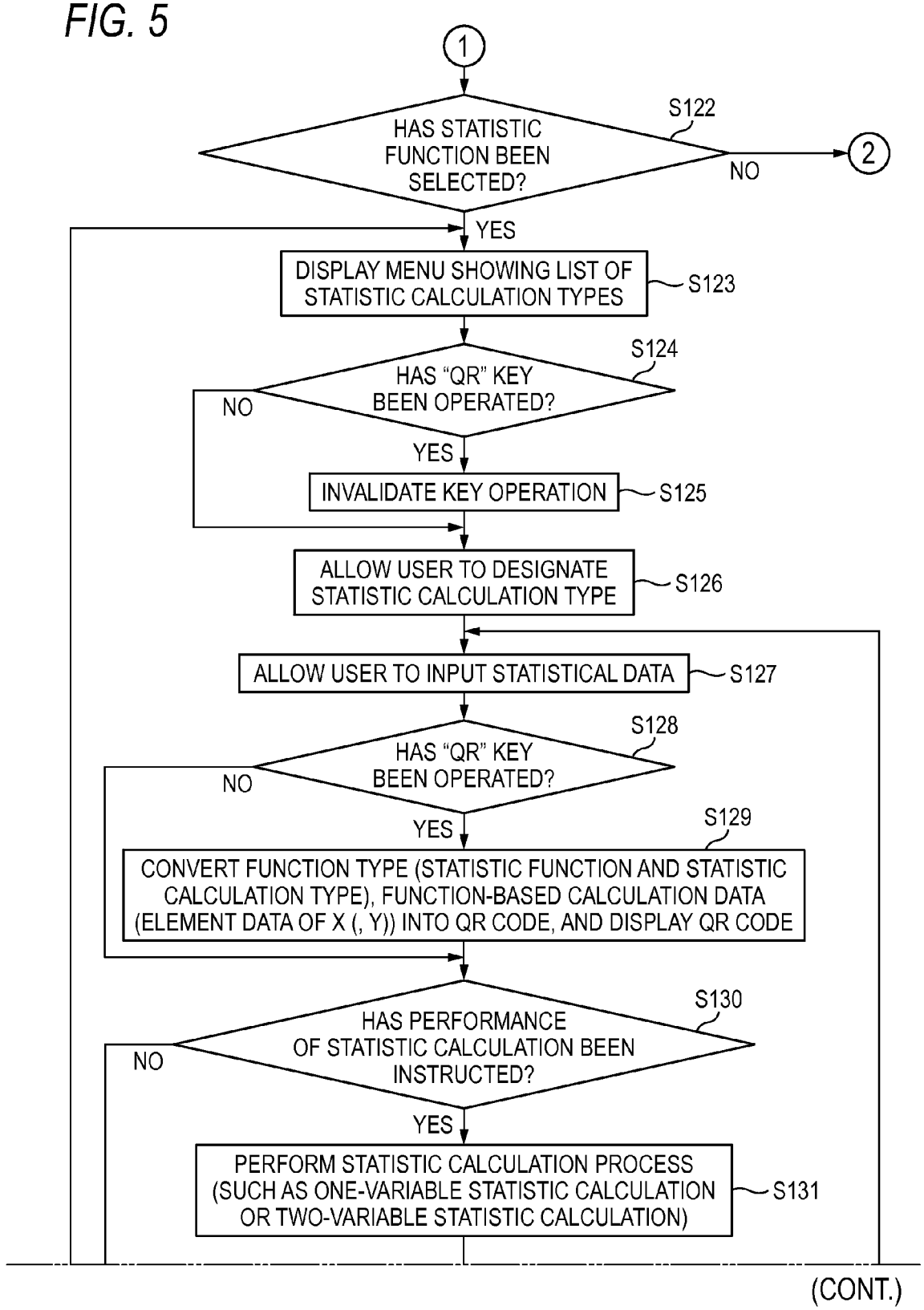
FIG. 5 is a flow chart illustrating another part of the display control process of the scientific calculator 10.
Figure 6:
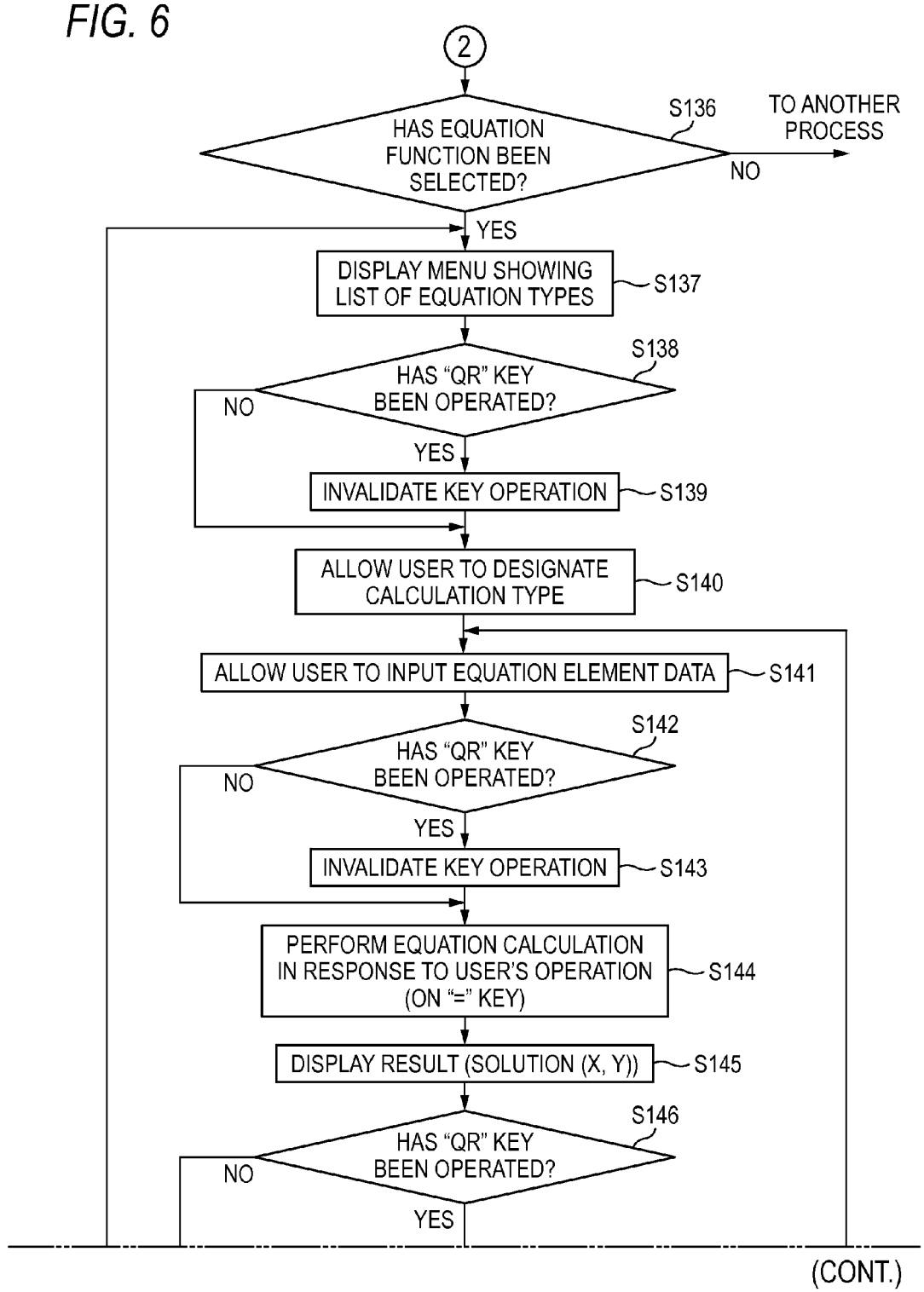
FIG. 6 is a flow chart illustrating the other part of the display control process of the scientific calculator 10.

FIGS. 4 to 6 are flow charts illustrating a display control process of the scientific calculator 10.

Figure 7:
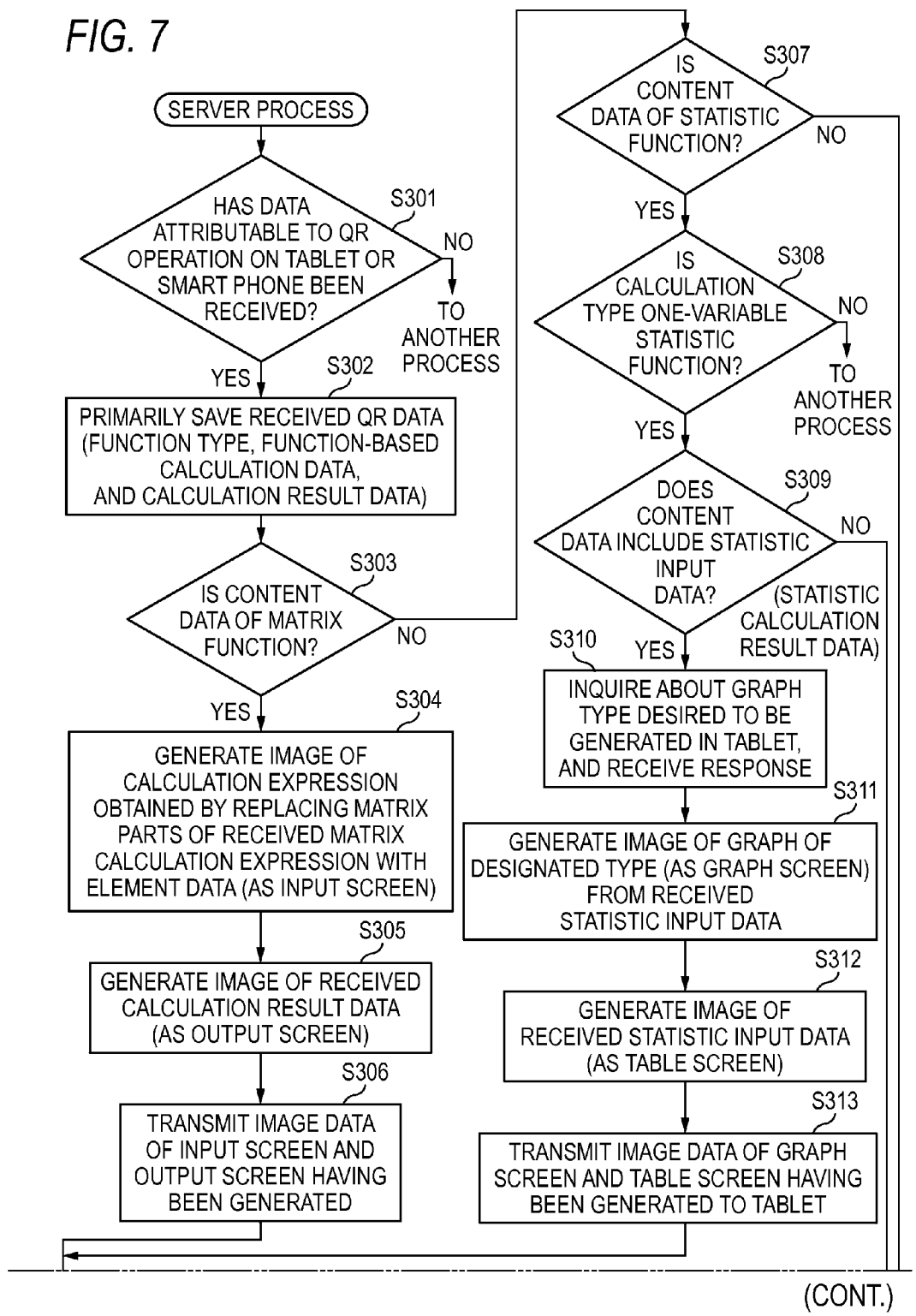
FIG. 7 is a flow chart illustrating a server process of the compute server 30.

FIG. 7 is a flow chart illustrating a server process of the compute server 30.

Figure 8:
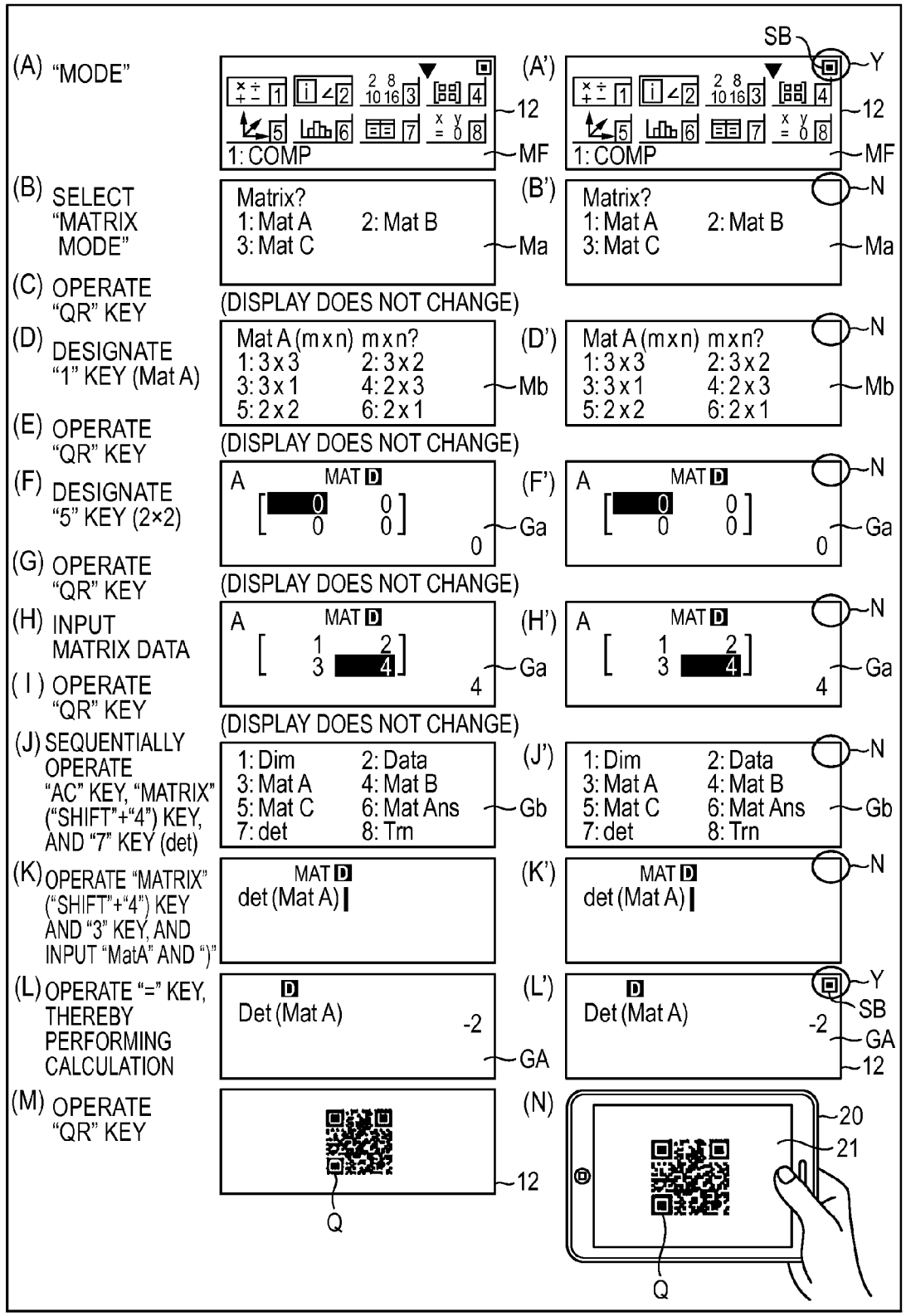
FIG. 8 is a view illustrating display operations according to user's operations in a matrix mode according to the display control process of the scientific calculator 10.

FIG. 8 is a view illustrating a display operation according to a user's operation in the matrix mode according to the display control process of the scientific calculator 10.

Figure 9:
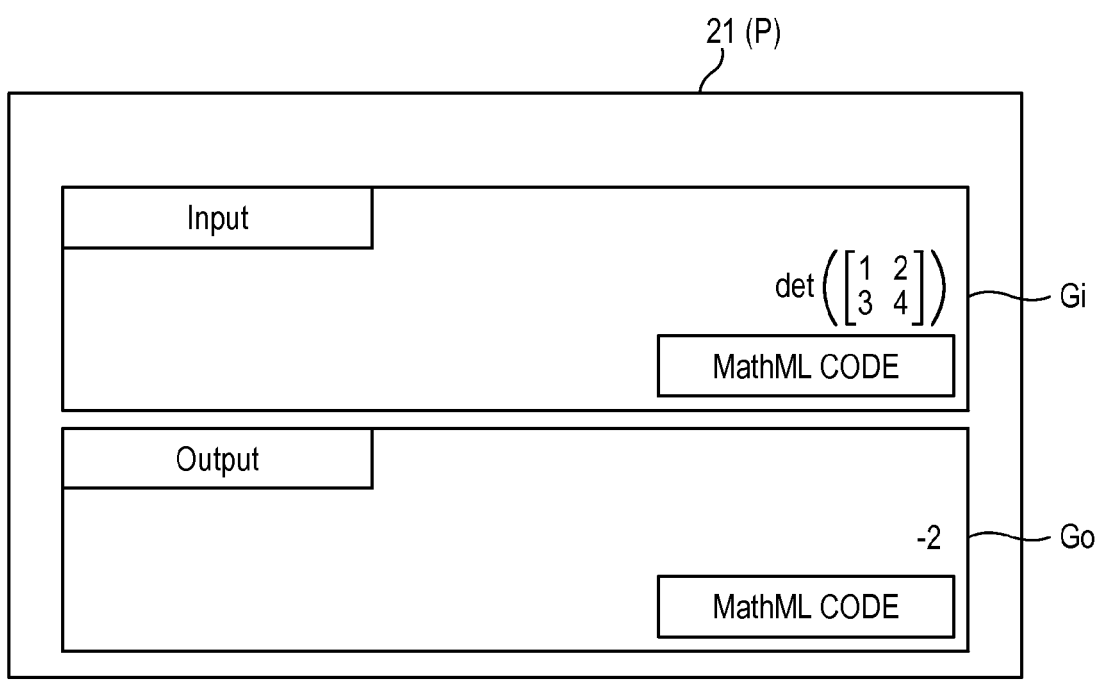
FIG. 9 is a view illustrating image data of matrix calculation reference information generated according to the server process of the compute server 30 based on barcode content data (QR data) in the matrix mode of the scientific calculator 10.

FIG. 9 is a view illustrating image data of matrix calculation reference information generated according to the server process of the compute server 30 based on barcode content data (QR data) in the matrix mode of the scientific calculator 10.

In the scientific calculator (an information display device) 10, if the "MODE" key of the key input unit 11 is operated as shown in Part (A) of FIG. 8, in STEP T101, a calculation function list menu MF is displayed on the display output unit 12.

In the calculation function list menu MF of the present embodiment, eight calculation functions ([1] FOUR-BASIC-OPERATION FUNCTION, [2] COMPLEX NUMBER CALCULATION FUNCTION, [3] N-ARY CALCULATION FUNCTION, [4] MATRIX CALCULATION FUNCTION, [5] VECTOR CALCULATION FUNCTION, [6] STATISTIC CALCULATION FUNCTION, [7] FUNCTION EXPRESSION TABLE CALCULATION FUNCTION, and [8] EQUATION CALCULATION FUNCTION) are displayed so as to be selectable.

(Matrix Calculation Process)

If the matrix calculation function of [4] is selected in the calculation function list menu MF by a user's operation (STEP S102), in STEP S103, as shown in Part (B) of FIG. 8, the operation mode of the scientific calculator 10 is set to the matrix mode, and a matrix name list menu Ma for inputting matrix element data is displayed on the display output unit 12.

In the state where the matrix name list menu Ma is displayed, even if the "QR" key (the "SHIFT"+"OPTN" key) is operated as shown in Part (C) of FIG. 8, the corresponding key operation is invalidated (inactivated), and thus the display content does not change (STEPS S104 and S105).

If a matrix name (here, "MatA" of No. 1) desired by the user is designated in the matrix name list menu Ma in STEP T106 as shown in Part (D) of FIG. 8, in STEP S107, a matrix size selection menu Mb is displayed on the display output unit 12.

In the state where the matrix size selection menu Mb is displayed, even if the "QR" key is operated as shown in Part (E) of FIG. 8, the corresponding key operation is invalidated (inactivated), and thus the display content does not change (STEPS S108 and S109).

If a desired matrix size (here, "2×2" of No. 5) is designated in the matrix size selection menu Mb with respect to the matrix name "MatA" in STEP T110 as shown in Part (F) of FIG. 8, in STEP S111, an element data input screen Ga corresponding to the designated matrix size is displayed.

In the state where the element data input screen Ga is displayed, even if the "QR" key is operated as shown in Parts (G) and (I) of FIG. 8, the corresponding key operation is invalidated (inactivated), and thus the display content does not change (STEPS S112 and S113).

After element data "1", "2", "3", and "4" of the matrix name "MatA" are input in the element data input screen Ga as shown in Part (H) of FIG. 8, if a clear process is performed by the "AC" key, and a "MATRIX" ("SHIFT"+ "4") key is operated, as shown in Part (J) of FIG. 8, in STEP S114, an expression input screen Gb is displayed.

If a matrix calculation expression (here, "det(MatA)") is input according to the expression input screen Gb, and a display is performed on the display output unit 12 as shown in Part (K) of FIG. 8, in STEP S115, the input matrix calculation expression "det(MatA)" and the element data "1", "2", "3", and "4" of the calculation object "MatA" are stored in an input data area of the memory 14.

In course of inputting of the matrix calculation expression, even if the "QR" key is operated, the corresponding key operation is invalidated (inactivated), and thus the display content does not change (STEPS S116 and S117).

Thereafter, if calculation execution is instructed by an operation on the "=" key as shown in Part (L) of FIG. 8, in STEP S118, a calculation according to the matrix calculation expression "det(MatA)" (MatA=1, 2, 3, 4) is performed, and a calculation result screen GA representing the corresponding calculation expression and the calculation result "−2" is displayed on the display output unit 12.

Thereafter, if the "QR" ("SHIFT"+"OPTN") key of the key input unit 11 is operated in STEP S119 as shown in Part (M) of FIG. 8 in order to obtain calculation reference information on the calculation expression "det(MatA)" and the calculation result "−2" from the compute server 30, in STEP S120, the current calculation function type "MATRIX CALCULATION FUNCTION", the function-based calculation data (the matrix calculation expression "det(MatA)" and the element data (MatA=1, 2, 3, 4) of the calculation object matrix), and the calculation result data "−2" are converted as barcode content data into a two-dimensional code image (a QR code) Q, and the corresponding image is output to the display output unit 12 by the CPU 13 and is displayed on the display output unit 12.

Thereafter, in a case where element data are re-input, the process returns from STEP S121 to STEP S111; whereas re-inputting is not performed, the process returns to STEP S103.

As described above, if the-dimensional code image (QR code) Q displayed on the display output unit 12 according to the calculation process by the matrix calculation function of the scientific calculator 10 is photographed by the communication device 20 with the camera (such as a tablet PC) belonging to the student or the teacher as shown in Part (M) of FIG. 8, the barcode content data (QR data) which is the content of the two-dimensional code image (QR code) is decoded, and the current calculation function type "MATRIX CALCULATION FUNCTION", the function-based calculation data (the matrix calculation expression "det(MatA)" and the element data (MatA=1, 2, 3, 4) of the calculation object matrix), and the calculation result data "−2" which are the barcode content data (QR data) are transmitted from the communication device 20 to the compute server 30 through the communication network N, automatically or in response to a user's operation (see FIG. 2). Also, the address for accessing to the compute server 30 is known in advance, and the user inputs the corresponding address by operating the communication device 20 with the camera. Alternatively, in a case where the two-dimensional code image (QR code) includes the address of the compute server, it is possible to extract the corresponding address from the barcode content data (QR data).

In the compute server 30, if the barcode content data (QR data), that is, the current calculation function type "MATRIX CALCULATION FUNCTION", the function-based calculation data (the matrix calculation expression "det(MatA)" and the element data (MatA=1, 2, 3, 4) of the calculation object matrix), and the calculation result data "−2" transmitted from the communication device 20 with the camera through the communication network N are received by the communication unit 35, the CPU 31 determines that the barcode content data (QR data) attributable to a QR operation has been received ("Yes" in STEP S301).

Then, in STEP S302, the received barcode content data (QR data), that is, the current calculation function type "MATRIX CALCULATION FUNCTION", the function-based calculation data (the matrix calculation expression "det(MatA)" and the element data (MatA=1, 2, 3, 4) of the calculation object matrix), and the calculation result data "−2" are primarily saved in the reception QR data memory 322 of the memory 32.

Then, if it is determined that the barcode content data (QR data) saved in the reception QR data memory 322 is data of the matrix calculation function ("Yes" in STEP S303), in STEP S304, an image of a calculation expression "det([1, 2, 3, 4])" obtained by replacing the matrix part "MatA" of the matrix calculation expression "det(MatA)" with the element data "1", "2", "3", and "4" is generated as an input screen Gi as shown in FIG. 9.

Subsequently, in STEP S305, an image of the calculation result data "−2" is generated as an output screen Go.

Then, in STEP S306, image data which is matrix calculation reference information generated by vertically disposing the generated input screen Gi and the generated output screen Go is transmitted to the mail address of the communication device 20 with the camera which is the transmission source of the received barcode content data (QR data) and belongs to the student or the teacher.

Therefore, on the display output unit 21 of the communication device 20 with the camera (such as a tablet PC with a camera) belonging to the student or the teacher, the image data Gi/Go of the matrix calculation expression (after replacement with the element data) calculated in the scientific calculator 10 of the teacher and the calculation result are displayed as the matrix calculation reference information as shown in FIG. 9. Thereafter, if the corresponding matrix calculation reference information Gi/Go is magnified and projected by the projector P, everyone of the class of the corresponding student or teacher can learn while seeing the content of the corresponding calculation.

Also, the matrix calculation function in the matrix mode of the scientific calculator 10 is performed in the same manner as that of the vector calculation function according to a vector mode, and thus a detailed description of the vector calculation function is omitted.

(Statistic Calculation Process)

FIG. 10 is a view illustrating a display operation according to calculation object element data input according to user's operations in a statistic mode according to the display control process of the scientific calculator 10, and image data of statistic calculation reference information (a first example) generated according to the server process of the compute server 30 based on barcode content data (QR data) output during the corresponding display operation.

If the statistic calculation function of [6] is selected in the calculation function list menu MF shown in Part (A) of FIG. 8 by a user's operation (STEP S122), in STEP S123, the operation mode of the scientific calculator 10 is set to the statistic mode, and a statistic calculation type list menu Mc for designating a statistic calculation type is displayed on the display output unit 12, as shown in Part (A) of FIG. 10.

In the state where the statistic calculation type list menu Mc is displayed, even if the "QR" key is operated as shown in Part (B) of FIG. 10, the corresponding key operation is invalidated (inactivated), and thus the display content does not change (STEPS S124 and S125).

If a calculation type (here, "1-VAR" of No. 1 representing a type "ONE-VARIABLE STATISTIC CALCULATION") desired by the user is designated in the statistic calculation type list menu Mc as shown in Part (C) of FIG. 10 in STEP S126, a table data input screen (here, a one variable input screen) Gc for inputting calculation object element (table) data of the designated calculation type "ONE-VARIABLE STATISTIC CALCULATION" is displayed.

If desired calculation object element (table) data (here, x values 1, 12, 34, . . . , 29, 12, and 1) are input on the table data input screen (one variable input screen) Gc, in STEP S127, the designated calculation type "ONE-VARIABLE STATISTIC CALCULATION" and the input element data (the x values 1, 12, 34, . . . , 29, 12, and 1) are stored in the input data area 142 of the memory 14.

In the state where the calculation object element data x of the designated statistic calculation ("ONE-VARIABLE STATISTIC CALCULATION") have been input, if the "QR" key of the key input unit 11 is operated as shown in Part (D) of FIG. 10 in STEP S128 in order to obtain calculation reference information from the compute server 30, in STEP S129, the current calculation function type ("STATISTIC CALCULATION FUNCTION" and the calculation type ("ONE-VARIABLE STATISTIC CALCULATION")) and the function-based calculation data (the calculation object element data (the x values 1, 12, 34, . . . , 29, 12, and 1) are converted as barcode content data into a two-dimensional code image (QR code) Q, which is output to the display output unit 12 by the CPU 13 and is displayed on the display output unit 12.

If the two-dimensional code image (QR code) Q is displayed on the display output unit 12 according to the calculation process by the statistic calculation function of the scientific calculator 10 (after inputting of the calculation object element data) as described above, and is photographed as shown in Part (E) of FIG. 10 by the communication device 20 with the camera (such as a tablet PC) belonging to the student or the teacher, the content of the two-dimensional code image (QR code) is decoded, and the barcode content data, that is, the current calculation function type ("STATISTIC CALCULATION FUNCTION" and the calculation type ("ONE-VARIABLE STATISTIC CALCULATION")) and the function-based calculation data (the calculation object element data (the x values 1, 12, 34, . . . , 29, 12, and 1)) are transmitted from the communication device 20 to the compute server 30 through the communication network N, automatically or in response to a user's operation (see FIG. 2).

In the compute server 30, if the communication unit 35 receives the barcode content data (QR data) from the communication device 20 with the camera through the communication network N, the CPU 31 determines that the barcode content data (QR data) attributable to a QR operation has been received ("Yes" in STEP S301).

Then, in STEP S302, the received barcode content data (QR data), that is, the current calculation function type ("STATISTIC CALCULATION FUNCTION" and the calculation type ("ONE-VARIABLE STATISTIC CALCULATION")) and the function-based calculation data (the calculation object element data (the x values 1, 12, 34, . . . , 29, 12, and 1)) are primarily saved in the reception QR data memory 322 of the memory 32.

Then, if it is determined that the barcode content data (QR data) saved in the reception QR data memory 322 is data of the statistic calculation function ("Yes" in STEP S307), and it is determined that the calculation type is "ONE-VARIABLE STATISTIC CALCULATION" ("Yes" in STEP S308), in STEP S309, it is determined whether the saved barcode content data (QR data) is barcode content data (QR data) including any calculation object element data (whether the saved barcode content data (QR data) is barcode content data (QR data) including statistic calculation result data).

If it is determined that the barcode content data (QR data) of the statistic calculation function saved in the reception QR data memory 322 is barcode content data (QR data) including calculation object element data ("Yes" in STEP S309), first, in STEP S311, according to a graph type ("BOX PLOT") designated as a default (STEP S310), a graph image of a box plot Hi is generated as a graph screen Gg based on the calculation object element data (the x values 1, 12, 34, ..., 29, 12, and 1) received and saved, as shown in Part (F) of FIG. 10.

Specifically, the graph image of the box plot Hi is drawn based on the calculation result (the minimum value "min(x)" of 1, the first quartile Q1 of 6.5, the median "Med" of 20.5, the third quartile Q3 of 33, and the maximum value "max(x)" of 43) obtained by performing the one-variable statistic calculation of the calculation object element data (the x values 1, 12, 34, and the like, 29, 12, and 1).

Also, in STEP S312, an image of a table T of the calculation object element data (the x values 1, 12, 34, and the like, 29, 12, and 1) received and saved is generated as a table screen Gt.

Then, in STEP S313, image data which is statistic calculation reference information (the first example) generated by vertically disposing the generated graph screen Gg and the generated table screen Gt is transmitted to the mail address of the communication device 20 with the camera which is the transmission source of the barcode content data (QR data) and belongs to the student or the teacher.

Therefore, on the display output unit 21 of the communication device 20 with the camera (such as a tablet PC with a camera) belonging to the student or the teacher, the image data Gg/Gt according to the statistic calculation process of the scientific calculator 10 of the teacher (after inputting of the calculation object element data) is displayed as the statistic calculation reference information (the first example) as shown in Part (F) of FIG. 10. Thereafter, if the statistic calculation reference information Gg/Gt is magnified and projected by the projector P, everyone of the class of the corresponding student or teacher can learn while seeing the content of the corresponding statistic calculation.

Also, in the state where the image data Gg/Gt which is the statistic calculation reference information (the first example) is displayed on the communication device 20 with the camera, if the compute server 30 receives information representing that another type has been designated as the graph type in response to a user's operation on a pull-down key PL for graph type designation provided on the graph screen Gg (STEP S310), in STEP S311, according to the designated graph type, a graph image of a bar chart Bo or a graph image of a pie chart Ci corresponding to the calculation object element data (the x values 1, 12, 34, ..., 29, 12, and 1) received and saved is generated as a graph screen Gg.

Figure 11:
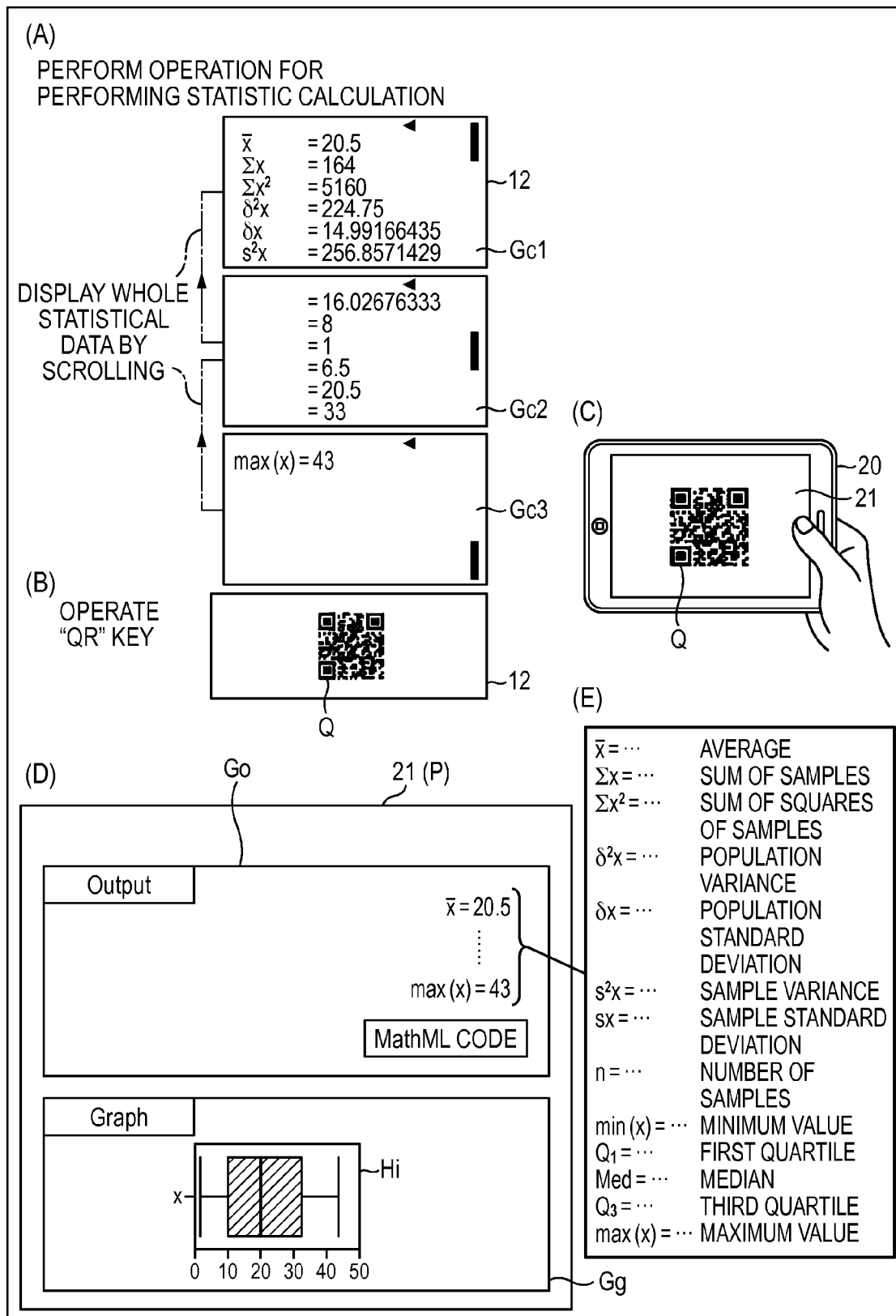
FIG. 11 is a view illustrating a display operation according to statistic calculation performance according to user's operations in the statistic mode according to the display control process of the scientific calculator 10, and image data of statistic calculation reference information (a second example) generated according to the server process of the compute server 30 based on barcode content data (QR data) output during the corresponding display operation.

FIG. 11 is a view illustrating a display operation according to statistic calculation performance according to user's operations in the statistic mode according to the display control process of the scientific calculator 10, and image data of statistic calculation reference information (a second example) generated according to the server process of the compute server 30 based on barcode content data (QR data) output during the corresponding display operation.

In the scientific calculator 10 of the statistic mode, after the calculation object element data (the x values 1, 12, 34, ..., 29, 12, and 1) for the statistic calculation (here, "ONE-VARIABLE STATISTIC CALCULATION") of the designated type are input according to the processes of STEPS S122 to S127, if calculation performance is instructed as shown in Part (A) of FIG. 11 by a user's operation on the "=" key ("Yes" in STEP S130), in STEP S131, the statistic calculation ("ONE-VARIABLE STATISTIC CALCULATION") of the designated type is performed.

In this case, in the one-variable statistic calculation performance process of STEP S131, for example, thirteen statistic calculation result data items (the average "$\bar{x}$", the sum of samples "$\Sigma x$", the sum of the squares of the samples "$\Sigma x^2$", the population variance "$\delta x^2$", the population standard deviation "$\delta x$", the sample variance "$sx^2$", the sample standard deviation "sx", the number of samples "n", the minimum value "min(x)", the first quartile Q1, the median "Med", the third quartile Q3, and the maximum value "max(x)") are acquired based on the calculation object element data (the x values 1, 12, 34, ..., 29, 12, and 1). Subsequently, in STEP S132, the individual statistic calculation result data items are divided into a plurality of calculation result screens Gc1 to Gc3, which is displayed on the display output unit 12 such that they can be displayed by screen scrolling.

Thereafter, if the "QR" key of the key input unit 11 is operated as shown in Part (B) of FIG. 11 in order to obtain the calculation reference information obtained by performing the designated statistic calculation (the one-variable statistic calculation) from the compute server 30 (STEP S133), in STEP S134, the current calculation function type ("STATISTIC CALCULATION FUNCTION" and the calculation type ("ONE-VARIABLE STATISTIC CALCULATION")), the statistic calculation result data items ("$\bar{x}$" (the average of x), $\Sigma x$, "$\Sigma x^2$, $\delta x^2$, $\delta x$, $sx^2$, sx, n, min(x), Q1, Med, Q3, and max(x)) are converted as barcode content data into a two-dimensional code image (QR code) Q, which is output to the display output unit 12 by the CPU 13 and which is displayed on the display output unit 12.

Thereafter, in a case where calculation object element data are re-input, the process returns from STEP S135 to STEP S127; whereas re-inputting is not performed, the process returns to STEP S123.

As described above, if the two-dimensional code image (QR code) Q displayed on the display output unit 12 according to the calculation performance by the statistic calculation function of the scientific calculator 10 is photographed by the communication device 20 with the camera (such as a tablet PC) belonging to the student or the teacher as shown in Part (C) of FIG. 11, the barcode content data (QR data) which is the content of the two-dimensional code image (QR code) is decoded, and the corresponding barcode content data (QR data), that is, the current calculation function type ("STATISTIC CALCULATION FUNCTION" and the calculation type ("ONE-VARIABLE STATISTIC CALCULATION")) and the statistic calculation result data items ("$\bar{x}$" (the average of x), $\Sigma x$, "$\Sigma x^2$, $\delta x^2$, $\delta x$, $sx^2$, sx, n, min(x), Q1, Med, Q3, and max(x)) are transmitted from the communication device 20 to the compute server 30 through the communication network N, automatically or in response to a user's operation (see FIG. 2).

In the compute server 30, if the barcode content data (QR data), that is, the current calculation function type ("STATISTIC CALCULATION FUNCTION" and the calculation type ("ONE-VARIABLE STATISTIC CALCULATION")) and the statistic calculation result data items ("$\bar{x}$" (the average of x), $\Sigma x$, "$\Sigma x^2$, $\delta x$, $\delta x$, $sx^2$, sx, n, min(x), Q1, Med, Q3, and max(x)) transmitted from the communication device 20 with the camera through the communication network N are received by the communication unit 35, the CPU 31 determines that barcode content data (QR data) attributable to a QR operation has been received ("Yes" in STEP S301).

Then, in STEP S302, the received barcode content data (QR data), that is, the current calculation function type ("STATISTIC CALCULATION FUNCTION" and the calculation type ("ONE-VARIABLE STATISTIC CALCULATION")) and the statistic calculation result data items ($\bar{x}$, $\Sigma x$, $\Sigma x^2$, ..., Med, Q3, and max(x)) according to performance of the statistic calculation process of the scientific calculator 10 are primarily saved in the reception QR data memory 322 of the memory 32.

Then, if it is determined that the barcode content data (QR data) saved in the reception QR data memory 322 is data of the statistic calculation function ("Yes" in STEP S307), and it is determined that the calculation type is "ONE-VARIABLE STATISTIC CALCULATION" ("Yes" in STEP S308), and it is determined that the saved barcode content data (QR data) is barcode content data (QR data) including statistic calculation result data ("No" in STEP S309), in STEP S314, based on the statistic calculation result data items ($\bar{x}$, $\Sigma x$, $\Sigma x^2$, ..., Med, Q3, and max(x)) received and saved, an image showing the list of the statistic calculation result data items is generated as an output screen Go as shown in Parts (D) and (F) of FIG. 11.

Also, in STEP S315, based on the statistic calculation result data items ($\bar{x}$, $\Sigma x$, $\Sigma x^2$, ..., Med, Q3, and max(x)) received and saved, a graph image of a box plot Hi is generated as a graph screen Gg in the above described generation manner.

Then, in STEP S316, image data which is statistic calculation reference information (the second example) generated by vertically disposing the generated output screen Go and the generated graph screen Gg is transmitted to the mail address of the communication device 20 with the camera which is the transmission source of the barcode content data (QR data) and belongs to the student or the teacher.

Therefore, on the display output unit 21 of the communication device 20 with the camera (such as a tablet PC with a camera) belonging to the student or the teacher, the image data Go/Gg according to the statistic calculation process (statistic calculation performance) of the scientific calculator 10 of the teacher is displayed as the statistic calculation reference information (the second example) as shown in Part (D) of FIG. 11. Thereafter, if the statistic calculation reference information Go/Gg is magnified and projected by the projector P, everyone of the class of the corresponding student or teacher can learn while seeing the content of the corresponding statistic calculation.

Figure 12:
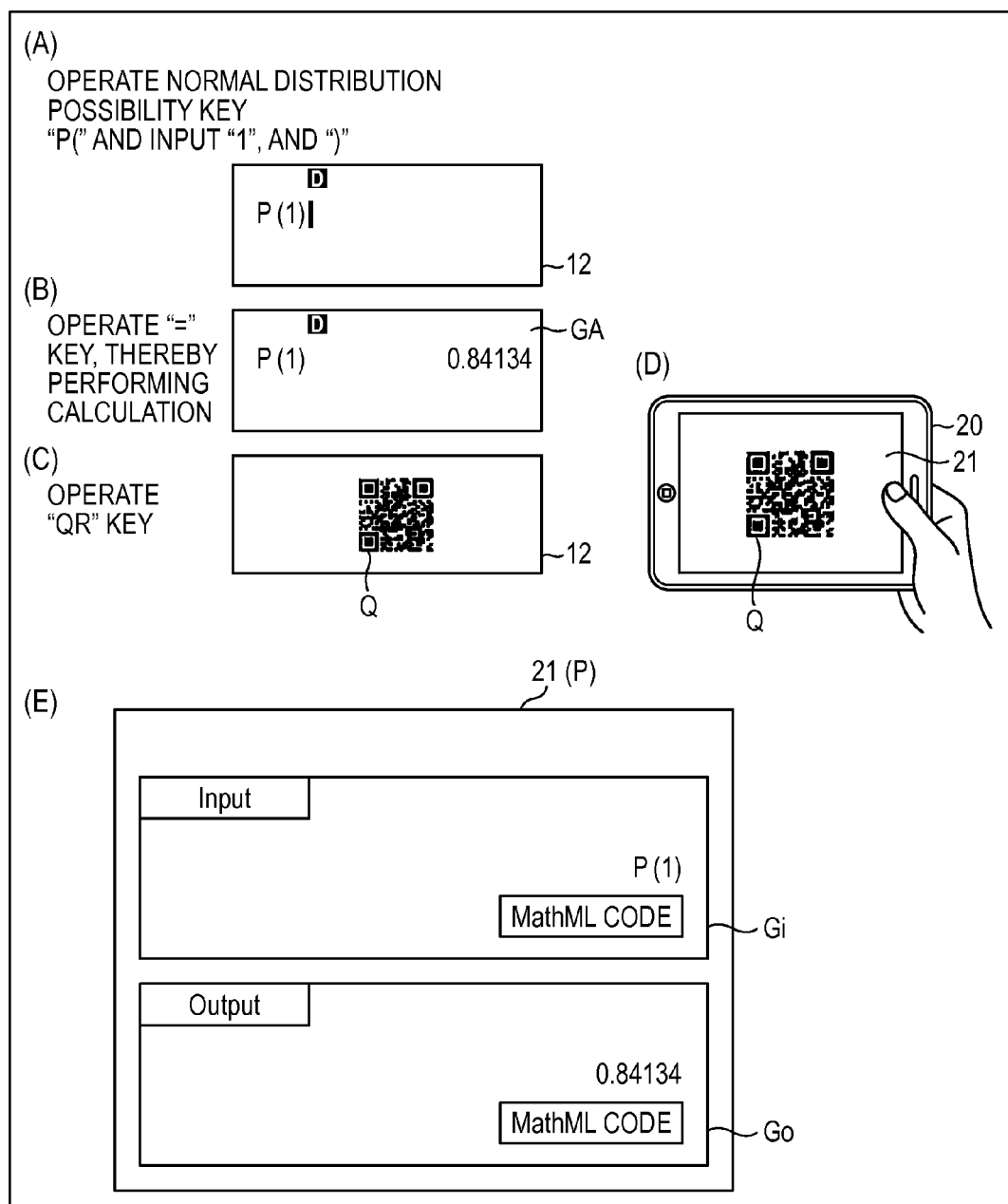
FIG. 12 is a view illustrating a display operation according to statistic calculation performance according to user's operations in the statistic mode according to the display control process of the scientific calculator 10, and image data of statistic calculation reference information generated according to the server process of the compute server 30 based on barcode content data (QR data) output during the corresponding display operation.

FIG. 12 is a view illustrating a display operation according to statistic calculation performance according to user's operations in the statistic mode according to the display control process of the scientific calculator 10, and image data of statistic calculation reference information generated according to the server process of the compute server 30 based on barcode content data (QR data) output during the corresponding display operation.

In the embodiment shown in FIG. 12, in STEPS S122 to S126, "NORMAL DISTRIBUTION PROBABILITY CALCULATION" is designated as the statistic calculation type.

Thereafter, with respect to distribution probabilities P(t), Q(t), and R(t) which are calculation objects, if element data P(1) of the distribution probability P(t) is input in STEP S127 as shown in Part (A) of FIG. 12, and calculation performance is instructed as shown in Part (B) of FIG. 12 by an operation on the "=" key ("Yes" in STEP S130), a calculation of a normal distribution probability P(1) is performed in STEP S131, and a calculation result screen GA showing the calculation result "0.84134" is displayed on the display output unit 12 in STEP S132.

Thereafter, if the "QR" key of the key input unit 11 is operated as shown in Part (B) of FIG. 12 in STEP S133 in order to obtain calculation reference information obtained by performing the designated statistic calculation ("NORMAL DISTRIBUTION PROBABILITY CALCULATION") from the compute server 30, in STEP S134, the current calculation function type ("STATISTIC CALCULATION FUNCTION" and the calculation type ("NORMAL DISTRIBUTION PROBABILITY CALCULATION")) and the statistic calculation result data "0.84134" are converted into a two-dimensional code image (QR code) Q, which is output to the display unit 12 by the CPU 13 and which is displayed on the display output unit 12.

Thereafter, if the two-dimensional code image (QR code) is photographed as described above by the communication device with the camera (such as a tablet PC) 20 belonging to the student or the teacher, barcode content data (QR data) which is the content of the two-dimensional code image (QR code) is decoded, and the barcode content data (QR data) is transmitted from the communication device 20 to the compute server 30 through the communication network N, automatically or in response to a user's operation (see FIG. 2).

In this case, in the compute server 30, as shown in Part (E) of FIG. 12, according to the barcode content data (QR data) received from the communication device 20 with the camera, an image of a calculation expression "P(1)" of the normal distribution probability calculation is generated as an input screen Gi, and an image of the calculation result data "0.84134" is generated as an output screen Go.

Thereafter, image data obtained as statistic calculation reference information (the third example) by vertically disposing the generated input screen Gi and the generated output screen Go is transmitted to the mail address of the communication device 20 with the camera which is the transmission source of the barcode content data (QR data) and belongs to the student or the teacher.

(Equation Calculation Process)

FIG. 13 is a view illustrating display operations according to user's operations in an equation mode according to the display control process of the scientific calculator 10.

Figure 14:
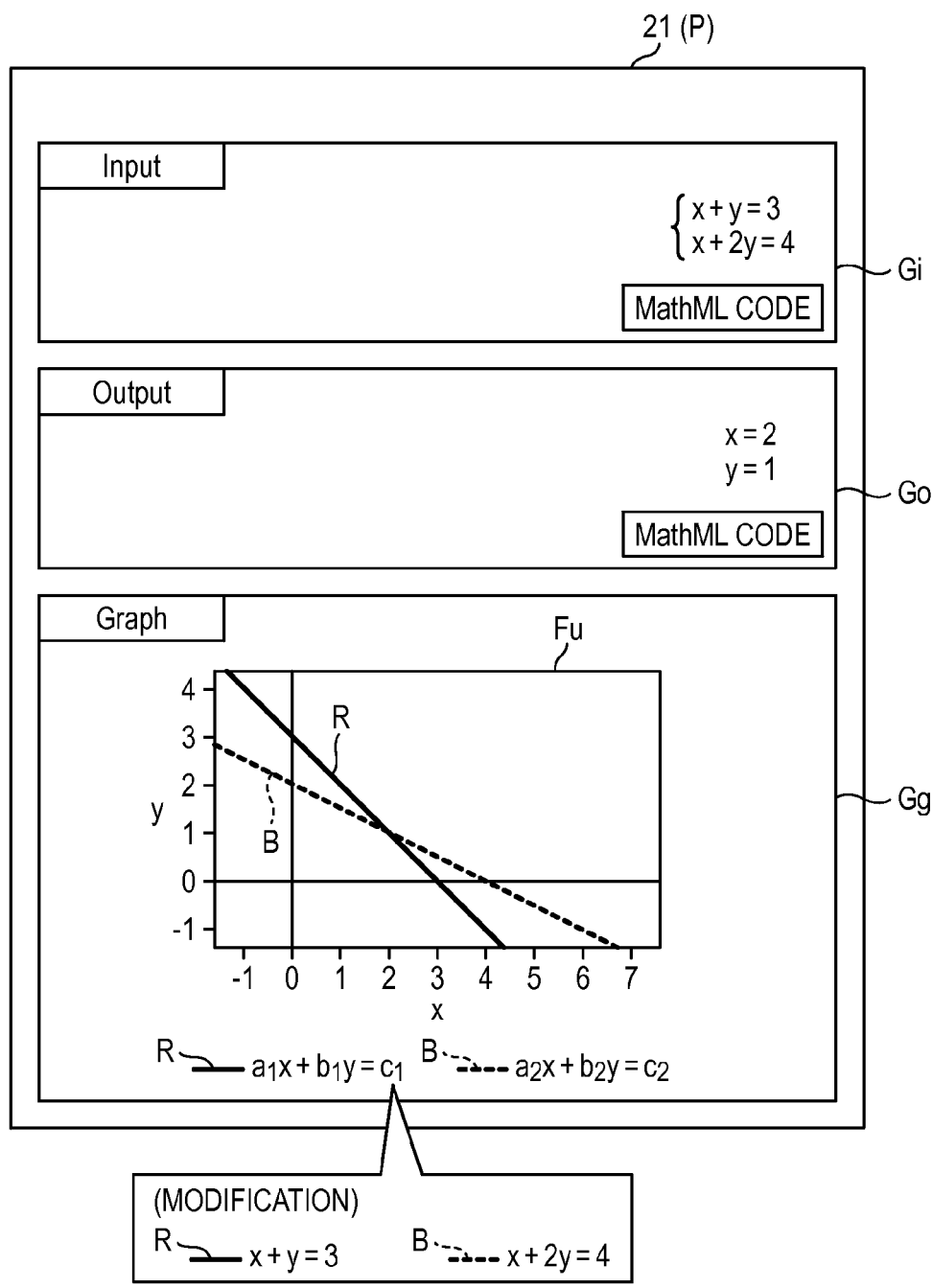
FIG. 14 is a view illustrating image data of equation calculation reference information generated according to the server process of the compute server 30 based on barcode content data (QR data) in the equation mode of the scientific calculator 10.

FIG. 14 is a view illustrating image data of equation calculation reference information generated according to the server process of the compute server 30 based on barcode content data (QR data) of the equation mode of the scientific calculator 10.

If the equation calculation function of [8] is selected in the calculation function list menu MF of the scientific calculator 10 shown in Part (A) of FIG. 8 by a user's operation (STEP S136), in STEP S137, the operation mode of the scientific calculator 10 is set to the equation mode, and an equation calculation type list menu Md for designating an equation calculation type is displayed on the display output unit 12, as shown in Part (A) of FIG. 13.

In the state where the equation calculation type list menu Md is displayed, even if the "QR" key is operated as shown in Part (B) of FIG. 13, the corresponding key operation is invalidated (inactivated), and thus the display content does not change (STEPS S138 and S139).

If the user designates a desired calculation type (here, "anx+bnY=cn" representing a type "CALCULATION OF SYSTEM OF EQUATIONS WITH TWO VARIABLES") in the equation calculation type list menu Md as shown in Part (C) of FIG. 13 (STEP S140), an element data input screen (here, a coefficient (a, b, and c) input screen) Gd for inputting calculation object element data of the designated calculation type ("CALCULATION OF SYSTEM OF EQUATIONS WITH TWO VARIABLES") is displayed.

If desired calculation object element data (here, values "1", "1", and "3" of coefficients "a1", "b1", and "c1" of a first equation, and values "1", "2", and "4" of coefficients "a2", "b2", and "c3" of a second equation) are input on the element data input screen (a, b, and c) Gd as shown in Part (E) of FIG. 13, in STEP S141, the designated calculation type "CALCULATION OF SYSTEM OF EQUATIONS WITH TWO VARIABLES" and the input element data are stored in the input data area 142 of the memory 14. Also, for example, in a case where the coefficient value of the variable "x" is 1, "x" is displayed instead of "1x", and in a case where the coefficient value of the variable "x" is 0, display of the variable "x" is deleted.

In the state where the element calculation type list menu (the coefficient input screen) Gd is displayed, even if the "QR" key is operated as shown in Parts (D) and (F) of FIG. 13, the corresponding key operation is invalidated (inactivated), and thus the display content does not change (STEPS S142 and S143).

Thereafter, if calculation performance is instructed by a user's operation on the "=" key as shown in Part (G) or (I) of FIG. 13 ("Yes" in STEP S144), an equation calculation of the designated type ("CALCULATION OF SYSTEM OF EQUATIONS WITH TWO VARIABLES") is performed, and an X solution calculation result screen GX or a Y solution calculation result screen GY showing the calculation result [X=1, Y=1] is displayed on the display output unit 12 in STEP S145.

Also, as shown in Part (H) or (J) of FIG. 13, switching between the X solution calculation result screen GX and the Y solution calculation result screen GY is performed in response to a user's operation on the "QR" key of the key input unit 11.

Thereafter, if the "QR" key of the key input unit 11 is operated in STEP S146 in order to obtain calculation reference information obtained by performing the designated equation calculation ("CALCULATION OF SYSTEM OF EQUATIONS WITH TWO VARIABLES") from the compute server 30, in STEP S147, the current calculation function type ("EQUATION CALCULATION FUNCTION" and the calculation type ("CALCULATION OF SYSTEM OF EQUATIONS WITH TWO VARIABLES")), the function-based calculation data (the calculation object equation element data (the values "1", "1", and "3" of the coefficients "a1", "b1", and "c1" of the first equation, and the values "1", "2", and "4" of the coefficients "a2", "b2", and "c3" of the second equation), and the equation calculation result data (X=2, Y=1) are converted into a two-dimensional code image (QR code) Q, which is output to the display output unit 12 by the CPU 13 and which is displayed on the display output unit 12.

Thereafter, in a case where calculation object element data are re-input, the process returns from STEP S148 to STEP S141; whereas re-inputting is not performed, the process returns to STEP S137.

As described above, if the two-dimensional code image (QR code) Q displayed on the display output unit 12 according to the calculation performance by the equation calculation function of the scientific calculator 10 is photographed by the communication device 20 with the camera (such as a tablet PC) belonging to the student or the teacher as shown in Part (K) of FIG. 13, barcode content data (QR data) which is the content of the two-dimensional code image (QR code) is decoded, and the corresponding barcode content data (QR data), that is, the current calculation function type ("EQUATION CALCULATION FUNCTION" and the calculation type ("CALCULATION OF SYSTEM OF EQUATIONS WITH TWO VARIABLES")), the function-based calculation data (the calculation object equation element data (the values "1", "1", and "3" of the coefficients "a1", "b1", and "c1" of the first equation, and the values "1", "2", and "4" of the coefficients "a2", "b2", and "c3" of the second equation), and the equation calculation result data (X=2, Y=1) are transmitted from the corresponding communication device 20 to the compute server 30 through the communication network N, automatically or in response to a user's operation (see FIG. 2).

In the compute server 30, if the barcode content data (QR data) transmitted from the communication device 20 with the camera through the communication network N are received by the communication unit 35, the CPU 31 determines that the barcode content data (QR data) attributable to a QR operation has been received ("Yes" in STEP S301).

Then, in STEP S302, the received barcode content data (QR data), that is, the current calculation function type ("EQUATION CALCULATION FUNCTION" and the calculation type ("CALCULATION OF SYSTEM OF EQUATIONS WITH TWO VARIABLES")), the function-based calculation data (the calculation object equation element data (the values "1", "1", and "3" of the coefficients "a1", "b1", and "c1" of the first equation, and the values "1", "2", and "4" of the coefficients "a2", "b2", and "c3" of the second equation), and the equation calculation result data (X=2, Y=1) are primarily saved in the reception QR data memory 322 of the memory 32.

Then, if it is determined that the barcode content data (QR data) saved in the reception QR data memory 322 is data of the equation calculation function ("Yes" in STEP S317), in STEP S318, based on the calculation type ("CALCULATION OF SYSTEM OF EQUATIONS WITH TWO VARIABLES") and the element data (the values "1", "1", and "3" of the coefficients "a1", "b1", and "c1" of the first equation, and the values "1", "2", and "4" of the coefficients "a2", "b2", and "c3" of the second equation), an image of the calculation expression of the system of equations with two variables "x+y=3" and "x+2y=4" is generated as an input screen Gi as shown in FIG. 14.

Also, in STEP S319, an image of the calculation result data (X=2, Y=1) is generated as an output screen Go.

Subsequently, in STEP S320, based on the calculation type ("CALCULATION OF SYSTEM OF EQUATIONS WITH TWO VARIABLES") and the element data (the values "1", "1", and "3" of the coefficients "a1", "b1", and "c1" of the first equation, and the values "1", "2", and "4" of the coefficients "a2", "b2", and "c3" of the second equation), a graph image Fu including a graph R (red) corresponding to the first equation "x+y=3" and a graph B (blue) corresponding to the second equation "x+2y=4" is generated as a graph screen Gg. At this time, in association with the graph image, information representing that the first equation "x+y=3" is the graph R (shown in red by a solid line) and information representing that the second equation "x+2y=4" is the graph B (shown in blue by a dotted line) may be displayed.

Thereafter, in STEP S321, image data obtained as equation calculation reference information by vertically disposing the input screen Gi, the output screen Go, and the graph screen Gg is transmitted to the mail address of the communication device 20 with the camera which is the transmission source of the barcode content data (QR data) and belongs to the student or the teacher.

Therefore, on the display output unit 21 of the communication device 20 with the camera (such as a tablet PC with a camera) belonging to the student or the teacher, the image data Gi/Go/Gg composed of the system of equations with two variables calculated in the scientific calculator 10 of the teacher, the calculation result, and their graphs is displayed as the equation calculation reference information as shown in FIG. 14. Thereafter, if the corresponding equation calculation reference information Gi/Go/Gg is magnified and projected by the projector P, everyone of the class of the corresponding student or teacher can learn while seeing the content of the corresponding equation calculation.

Also, the equation calculation function in the equation mode of the scientific calculator 10 is processed in the same manner as that of an inequality calculation function according to an inequality mode, and thus a detailed description of the corresponding inequality calculation function will not be made.

Also, in a process according to each of various calculation functions in the scientific calculator 10, only in process steps in which it is possible to acquire data (function type data, function-based calculation data, and calculation result data) for obtaining appropriate calculation reference information from the compute server 30 according to a corresponding calculation function type, a key operation on the "QR" key is valid (activated), and in the other process steps, a key operation on the "QR" key is invalid (inactivated). Further, in order to clearly show process steps in which it is possible to acquire appropriate calculation reference information, as shown by a circled Y or a circled N of Parts (A') to (L') of FIG. 8, in a case where a key operation on the "QR" key is valid (activated), a QR symbol SB may be displayed; whereas in a case where a key operation on the "QR" key is invalid (inactivated), the QR symbol SB may not be displayed.

Therefore, according to the scientific calculator (an information display device) 10 having the above described configuration, if the user selects a desired calculation function type (a mode), and inputs numerical value data to be calculation object element data in a calculation expression of the selected calculation function type, and instructs performance of the corresponding calculation, calculation result data calculated according to the calculation expression and the calculation object element data is displayed on the display output unit 12. Further, in the selected calculation function type (the mode), in a stage in which the calculation object element data or/and the calculation result data have been obtained, if the "QR" key is operated, in addition to the calculation function type (the selected calculation function type and the calculation type (calculation expression) in the corresponding calculation function), the calculation object element data or/and the calculation result data are converted into a two-dimensional code (QR code), which is displayed on the display output unit 12.

Therefore, the user can acquire appropriate calculation reference information from the compute server 30 at an appropriate timing in the calculation process only by reading the displayed two-dimensional code by the communication device (such as a tablet PC) 20 with the camera having a general-purpose two-dimensional code reading function, thereby converting the two-dimensional code into data, and transmitting the data to the compute server 30, and can learn the corresponding calculation while seeing the calculation reference information.

Therefore, according to the scientific calculator (the information display device) 10, it is possible to output appropriate data for generating appropriate reference information in an external device, according to a calculation type and a calculation state, such that the external device can acquire the output data.

Also, according to the compute server 30 having the above described configuration, in a case where a calculation function type ("MATRIX CALCULATION FUNCTION" and a calculation expression) in the matrix calculation function of the scientific calculator 10, calculation object element data, and calculation result data are received as two-dimensional code data, an input screen Gi which is an image of the input calculation expression to which the corresponding calculation object element data have been input, and an output screen Go which is an image of the corresponding calculation result data are generated, and are transmitted as matrix calculation reference information to the communication device 20 which is the data transmission source.

Further, according to the compute server 30 having the above described configuration, in a case where a calculation function type ("STATISTIC CALCULATION FUNCTION" and a statistic calculation type (for example, "ONE-VARIABLE STATISTIC CALCULATION")) in the statistic calculation function of the scientific calculator 10, and calculation object element data (table data of a variable "x") are received as two-dimensional code data, a graph screen Gg which is a graph image of a box plot Hi of the calculation object element data (the table data of the variable "x") and a table screen Gt which is an image of a table T of the corresponding element data are generated, and are transmitted as statistic calculation reference information (the first example) to the communication device 20 which is the data transmission source.

Furthermore, according to the compute server 30 having the above described configuration, in a case where a calculation function type ("STATISTIC CALCULATION FUNCTION" and statistic calculation types (thirteen types)) in the statistic calculation function of the scientific calculator 10, and the result data items of the individual calculations are received as two-dimensional code data, an output screen Go showing the list of the calculation result data items, and a graph screen Gg which is a graph image of a box plot Hi of the calculation result data items are generated, and are transmitted as statistic calculation reference information (the second example) to the communication device 20 which is the data transmission source.

Also, according to the compute server 30 having the above described configuration, in a case where a calculation function type ("EQUATION CALCULATION FUNCTION" and an equation calculation type (for example, "CALCULATION OF SYSTEM OF EQUATIONS WITH TWO VARIABLES") in the equation calculation function of the scientific calculator 10, calculation object element data, and calculation result data are received as two-dimensional code data, an input screen Gi which is an image of the system of equations to which the calculation object element data have been input, an output screen Go which is an image of the corresponding calculation result data, and a graph screen Gg which is a graph image Fu of the system of equations are generated, and are transmitted as equation calculation reference information to the communication device 20 which is the data transmission source.

Therefore, the user of the scientific calculator (the information display device) 10 can acquire calculation reference information having appropriate content at an appropriate timing in various calculation processes, and can learn while seeing the calculation reference information.

Also, the method of each process according to the calculator system described in each embodiment, that is, the method of each of the display control process of the scientific calculator (the information display device) 10 shown in the flow charts of FIGS. 4 to 6, the server process of the compute server 30 shown in FIG. 7, and the like can be stored, as a program which can be executable in any calculator, in a recording medium such as a memory card (such as a ROM card or a RAM card), a magnetic disk (such as a floppy (a trademark) disk or a hard disk), an optical disk (such as a CD-ROM or a DVD), or a semiconductor memory to be distributed. Also, program data for realizing the methods can be transmitted in a program code form on the communication network N, and the program data can be loaded into a computer of an electronic apparatus connected to the communication network N by a communication unit, thereby realizing the display control function and the server function described above.

Hereinafter, a preferred second embodiment of the present invention will be described with reference to the drawings.

[Functional Configuration of Information Processing System]

[Scientific Calculator]

Figure 15:
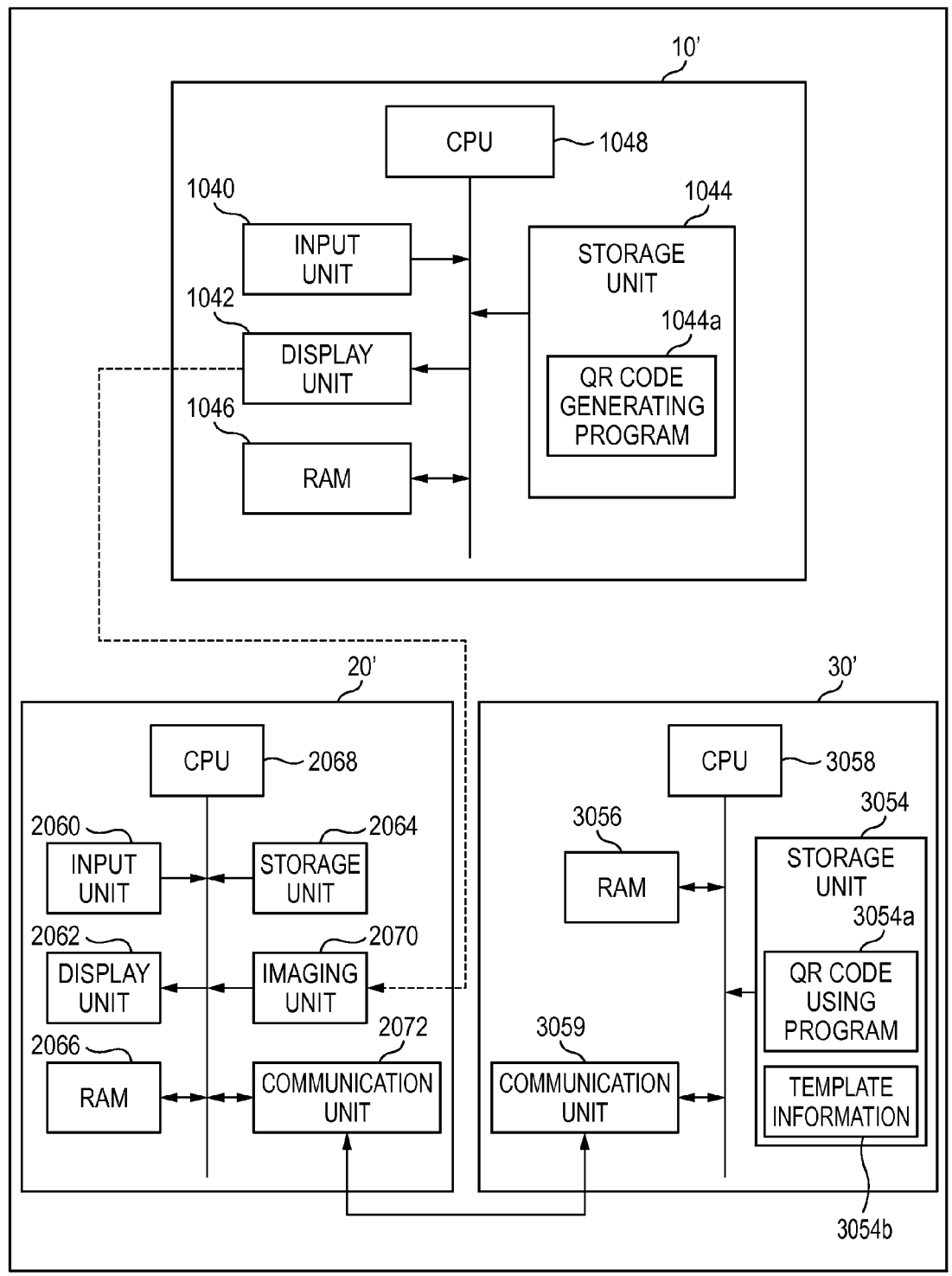
FIG. 15 is a block diagram schematically illustrating the functional configuration of an information processing system.

The scientific calculator 10' has the same external appearance as that of the scientific calculator 10 shown in FIG. 1, and as shown in FIG. 15, the scientific calculator 10' includes an input unit 1040, a display unit 1042, a storage unit 1044, a RAM (random access memory) 1046, and a CPU (central processing unit) 1048.

The input unit 1040 is composed of key groups, and is configured to output a signal corresponding to a depressed key to the CPU 1048.

The display unit 1042 is composed of a display 12, and is configured to display a variety of information according to signals from the CPU 1048.

The storage unit 1044 is a non-volatile memory which is composed of a ROM (read only memory) or the like.

The storage unit 1044 retains various programs. Here, especially, the storage unit retains a QR data generating program 1044a.

The QR data generating program 1044a is a program for making the CPU 1048 perform a QR data generating process (to be described below) (see FIG. 16A).

In the storage unit 1044, a variety of data are also retained.

In the storage unit 1044, a plurality of calculation modes, a terminal ID, and so on are retained.

The storage unit 1044 retains the plurality of calculation modes in association with mode codes assigned to the calculation modes in a one-to-one correspondence manner. The mode codes are for specifying the calculation modes.

The "terminal ID" is a model number which is unique to the scientific calculator 10' and specifies the model name of the scientific calculator 10'.

The RAM 1046 is a volatile memory which temporarily stores information.

The RAM 1046 is configured to form a plurality of work areas for storing various programs, data relative to those programs, and so on.

The CPU 1048 is for generally controlling every unit of the scientific calculator 10'.

The CPU 1048 is configured to develop a program in the RAM 1046 if the corresponding program is designated from a system program and various application programs retained in the storage unit 1044, and perform various processes in cooperation with the program developed in the RAM 1046.

[Server]

The server 30' has functions corresponding to the compute server 30 of FIG. 1, and has a configuration substantially similar to that of the scientific calculator 10'.

The server 30' includes not only a storage unit 3054, a RAM 3056, and a CPU 3058, but also a communication unit 3059.

The storage unit 3054 is a non-volatile memory which is composed of a ROM (read only memory) or the like.

The storage unit 3054 retains various programs. Here, especially, the storage unit retains a QR data using program 3054a.

The QR data using program 3054a is a program for making the CPU 3058 perform a QR data using process (to be described below) (see FIG. 16B).

In the storage unit 3054, a variety of data are also retained.

In the storage unit 3054, template information items 3054b are retained.

The template information items 3054b are information items equivalent to the plurality of calculation modes retained in the storage unit 1044 of the scientific calculator 10', and correspond to the plurality of calculation modes retained in the storage unit 1044 of the scientific calculator 10'. The storage unit 3054 retains the template information items 3054b in association with the calculation modes, respectively.

The storage unit 3054 also retains the template information items 3054b in association with the mode codes assigned to the calculation modes such that the calculation modes correspond to the mode codes in a one-to-one correspondence manner.

For each terminal ID, a plurality of template information items 3054b is retained. According to this data configuration, if a mode code and a terminal ID are specified, one calculation mode is specified.

The RAM 3056 is a volatile memory which temporarily stores information, and is configured to form a plurality of work areas for storing various programs, data relative to those programs, and so on.

The communication unit 3059 is composed of a so-called transceiver, and is used in data communication with the portable terminal 20'.

The CPU 3058 is for generally controlling every unit of the server 30'.

Especially, the CPU 3058 can extract an appropriate template information item 3054b (a calculation mode) from the storage unit 3054, and convert each template information item 3054b of the storage unit 3054.

[Portable Terminal]

The portable terminal 20' has functions corresponding to the communication device 20 with the camera shown in FIG. 1, and has a configuration substantially similar to that of the scientific calculator 10'.

The portable terminal 20' includes not only an input unit 2060, a display unit 2062, a storage unit 2064, a RAM 2066, and a CPU 2068, but also a photographing unit 2070, and a communication unit 2072.

The input unit 2060 is composed of a so-called touch panel, and is used to receive user's touch operations.

The display unit 2062 is composed of a display, and is configured to display a variety of information according to signals from the CPU 2068.

The storage unit 2064 is a non-volatile memory which is composed of a ROM or the like, and retains various programs and a variety of data.

The RAM 2066 is a volatile memory which temporarily stores information, and is configured to form a plurality of work areas for storing various programs, data relative to those programs, and so on.

The photographing unit 2070 is composed of a so-called camera, and is used to photogram QR codes which are displayed on the display 12 of the scientific calculator 10'.

The communication unit 2072 is composed of a so-called transceiver, and is used in data communication with the server 30'.

The CPU 2068 is for generally controlling every unit of the portable terminal 20'. Especially, the CPU 2068 can decode QR codes photographed by the photographing unit 2070, and transmit the decoded information from the communication unit 2072 to the server 30', and instruct the server 30' to perform calculation mode changing.

[Operation of Information Processing System]
[Operation of Scientific Calculator]

In the scientific calculator 10', the QR data generating process is performed.

If the QR data generating program 1044a is read from the storage unit 1044 and is developed in the RAM 1046, as a result, the QR data generating process is performed by cooperation of the QR data generating program 1044a and the CPU 1048. The CPU 1048 performs the QR data generating process according to the QR data generating program 1044a.

Figure 16A:
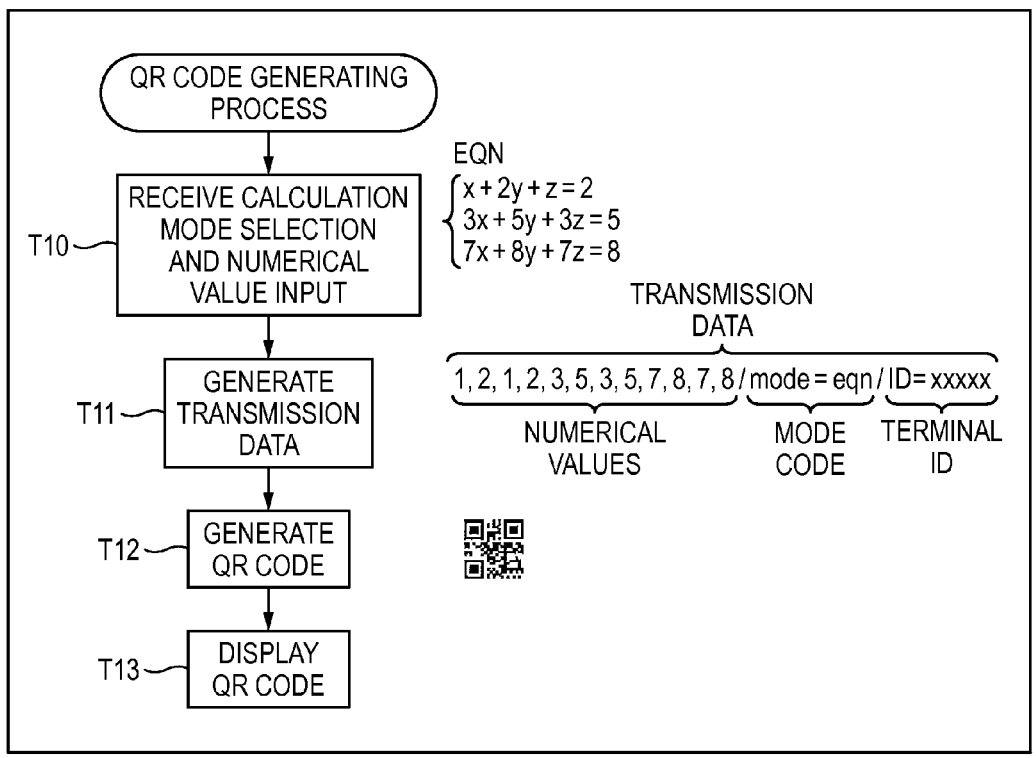
FIG. 16A is a flow chart illustrating the flow of a QR data generating process.

As shown in FIG. 16A, if a user selects one of the plurality of calculation modes by operating a MODE key 27 and a cursor key 114, and inputs numerical values by operating numeric keys, in STEP T10, the CPU 1048 receives the calculation mode selection and the numerical value input.

In FIG. 16A, there is shown an example in which an EQN (equation calculation) mode has been selected as a calculation mode, and a system of equations "$x+2y+z=2$", "$3x+5y+3z=5$", and "$7x+8y+7z=8$" have been input.

Thereafter, in STEP T11, the CPU 1048 generates transmission data including a mode code corresponding to the selected calculation mode, the input numerical values, and the terminal ID of the scientific calculator 10'.

In FIG. 16A, there is shown an example in which numerical values "1", "2", "1", and "2" sequentially representing the coefficients of the variables of the expression "$x+2y+z=2$" and the right-hand value of the corresponding expression, numerical values "3", "5", "3", and "5" similarly corresponding to "$3x+5y+3z=5$", and numerical values "7", "8", "7", and "8" similarly corresponding to "$7x+8y+7z=8$" have been input.

Thereafter, the CPU 1048 converts the transmission data into a QR code in STEP T12, and displays the generated QR code on the display 12 in STEP T13.

[Operation of Portable Terminal]

If a user photographs the QR code of the scientific calculator 10' by the photographing unit 2070, the CPU 2068 decodes the QR code into the transmission data, which is transmitted from the communication unit 2072 to the server 30'.

[Operation of Server]

In the server 30', the QR data using process is performed.

If the QR data using program 3054a is read from the storage unit 3054 and is developed in the RAM 3056, as a result, the QR data using process is performed by cooperation of the QR data using program 3054a and the CPU 3058. The CPU 3058 performs the QR data using process according to the QR data using program 3054a.

Figure 16B:
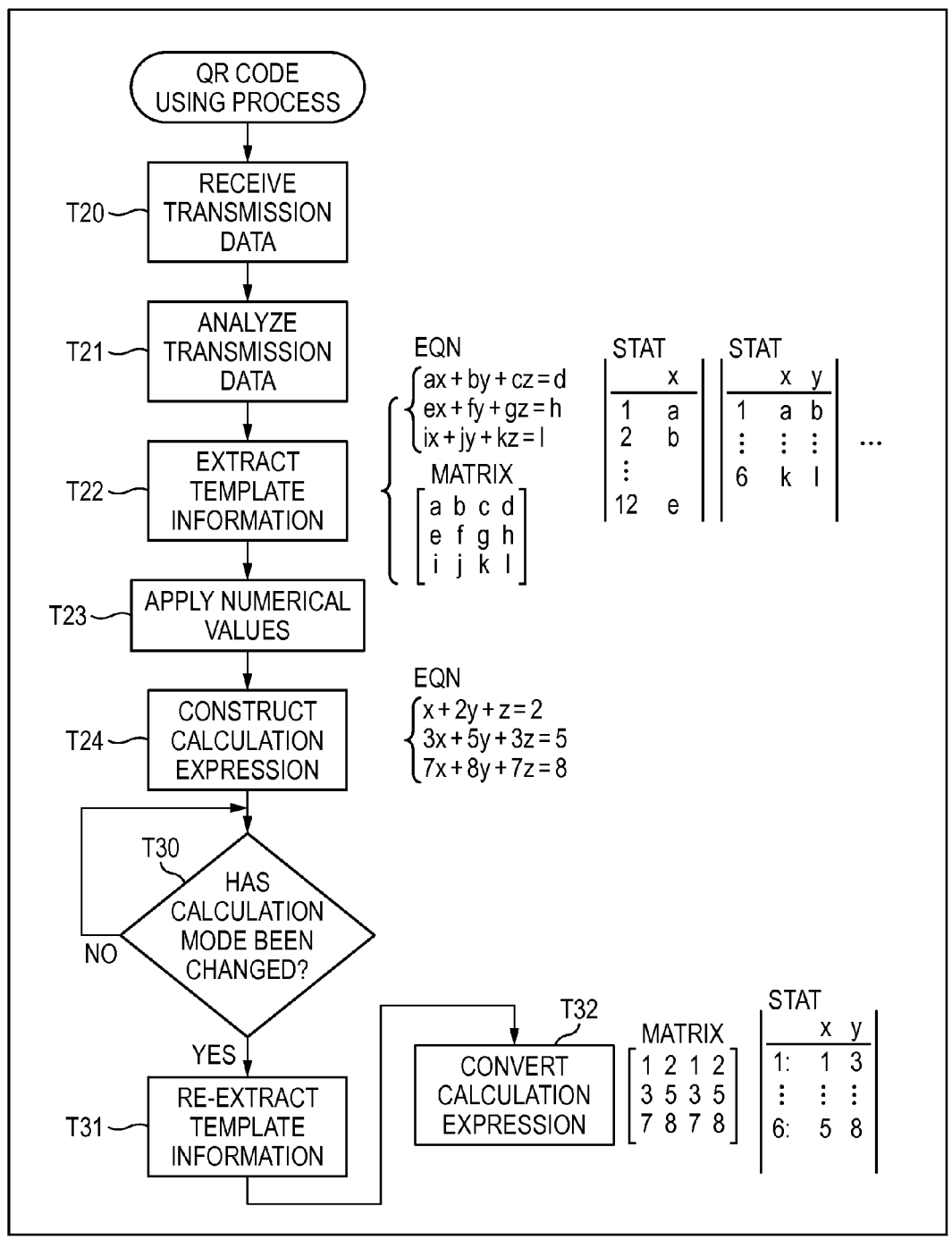
FIG. 16B is a flow chart illustrating the flow of a QR data using process.

As shown in FIG. 16B, the CPU 3058 receives the transmission data through the communication unit 3059 in STEP T20, and analyzes the transmission data in STEP T21.

Thereafter, in STEP T22, the CPU 3058 specifies the mode code, the numerical values, and the terminal ID included in the transmission data, based on the analysis result, and extracts a template information item 3054b corresponding to the mode code and the terminal ID, from the storage unit 3054.

Here, especially, with reference to the mode code included in the transmission data, the CPU 3058 specifies and extracts a template information item 3054b corresponding to the mode code.

In FIG. 16B, there is shown an example in which a template information item for the EQN mode corresponding to the mode code assigned to the EQN mode and included in the transmission data is extracted from the template information items such as the template information item for the EQN mode, a template information item for a MATRIX (matrix calculation) mode, and a template information item for a STAT (statistic calculation) mode.

Thereafter, the CPU 3058 applies the specified numerical values to the extracted template information item 3054b in STEP T23, and sets up the original calculation expression corresponding to the calculation mode selected by the scientific calculator 10', in STEP T24.

In FIG. 16B, there is shown an example in which the specified numerical values "1", "2", "1", "2", "3", "5", "3", "5", "7", "8", "7", and "8" have been applied to the coefficients "a" to "1" of the EQN mode template information item composed of a system of equations "$ax+by+cz=d$", "$ex+fy+gz=h$", and "$ix+jy+kz=l$", respectively.

Thereafter, the CPU 3058 transmits data on the set calculation expression from the communication unit 3059 to the portable terminal 20', whereby the user can use (calculate) the original calculation expression expressed by the scientific calculator 10', as it is, by the portable terminal 20'.

Thereafter, in STEP T30, the CPU 3058 repeatedly determines whether calculation mode changing has been performed in the portable terminal 20'.

In this process, if the user changes the calculation mode by performing a touch operation on the input unit 2060 of the portable terminal 20', the CPU 2068 of the portable terminal 20' transmits information on the change of calculation mode from the communication unit 2072 to the server 30', thereby instructing a change of calculation mode. The CPU 3058 of the server 30' receives the corresponding information through the communication unit 3059, and determines whether the calculation mode has been changed.

In a case where the calculation mode has been changed, in STEP T31, the CPU 3058 re-extracts a template information item 3054b corresponding to the changed calculation mode, from the storage unit 3054.

Thereafter, in STEP T32, the CPU 3058 applies the previously specified numerical values, as they are, to the re-extracted template information item 3054b, thereby converting the set calculation expression into another calculation expression.

In FIG. 16B, there is shown an example in which the calculation mode has been changed from the EQN mode to the MATRIX mode or the STAT mode, and the previously specified numerical values "1", "2", "1", "2", "3", "5", "3", "5", "7", "8", "7", and "8" have been applied to the coefficients "a" to "1" of the template information item for the MATRIX mode or the STAT mode.

Even in this case, the CPU 3058 transmits data on the converted calculation expression from the communication unit 3059 to the portable terminal 20', whereby the user can use the converted calculation expression, as it is, in the portable terminal 20'.

In the above described present embodiment, as shown in STEPS T10 to T13 of FIG. 16A and STEPS T20 to T24 of FIG. 16B, the scientific calculator 10' generates the QR code based on the mode code, the input numerical values, and the terminal ID, and the server 30' extracts the template information item 3054b based on the mode code and the terminal ID, and applies the input numerical values to the extracted template information item 3054b, and sets up the calculation expression corresponding to the calculation mode selected by the scientific calculator 10'.

According to this configuration, if the numerical values are input to the scientific calculator 10', in the server 30', the calculation mode is complemented, and the mathematical expression of the scientific calculator 10' is implemented as it is. Therefore, in the portable terminal 20', it is possible to instantly generate data on the mathematical representation such as equation representation and matrix representation in cooperation with the server 30'.

Further, since the server 30' already has the template information items 3054b, the scientific calculator 10' needs only to convert a small amount of data such as the mode code, the numerical values and the terminal ID into a code, and can virtually transmit data on the mathematical representation of the scientific calculator 10' to the portable terminal 20' through the server 30'.

As a result, even in the portable terminal 20', it is possible to use the mathematical representation of the scientific calculator 10' as it is.

In this case, since a mathematical representation display object is switched from the small-sized scientific calculator 10' to the large-sized portable terminal 20', it is possible to provide representation which is easy to be visually understood, for the user, and it is possible to output information such as mathematical representation data retained in the scientific calculator 10' to the outside, for example, by attachment to an electronic report, such that the corresponding information can be used.

As shown in STEPS T30 to T32 of FIG. 16B, in a state where the numerical values input to the scientific calculator 10' are fixed, in the server 30', it is possible to convert only the mathematical representation. Therefore, it is possible to flexibly cope with a change of calculation mode according to a user's design change.

Also, embodiments to which the present invention can be applied are not limited to the above described embodiments and modifications, and can be appropriately modified without departing from the scope of the present invention.

For example, although an electronic device (a first electronic device) according to the present invention has been described as the scientific calculator 10', products to which the present invention can be applied are not limited thereto. The first electronic device can be applied to general electronic devices such as portable phones, personal computers, tablet terminals (including smart phones), PDAs (personal digital assistants), and game consoles.

Although a second electronic device according to the present invention has been described as the portable terminal 20', the second electronic device can be applied to general electronic devices such as foldable mobile phones, personal computers, tablet terminals, PDAs, and game consoles as long as they basically have a photographing function and a communication function.

Although an information processing device according to the present invention has been described as the server 30', the information processing device can be applied to general electronic devices such as portable phones, personal computers, tablet terminals, PDAs, and game consoles as long as they basically have a communication function, a memory function, and an information processing function.

Also, the QR data generating program 1044a may be stored in an external information storage medium which can be inserted into or removed from the scientific calculator 10'.

The QR data using program 3054a also may be stored in an external information storage medium which can be inserted into or removed from the server 30'.

The present invention is not limited to the embodiments, and may have various modifications within the scope without departing from the spirit thereof at the time of carrying out the invention. In addition, the embodiments include inventions of various stages, and thus various inventions may be extracted by appropriate combinations of a plurality of disclosed constituent elements. For example, even if some constituent elements are deleted from all the constituent elements shown in the embodiments, or some constituent elements are combined in different forms, a configuration in which the constituent elements are deleted or combined may be extracted as an invention in a case of being capable of solving the problems described in the Problem that the Invention is to Solve and achieving the effects described in the Advantage of the Invention.

What is claimed is:

1. A calculator comprising:
   a display; and
   a processor, wherein the processor is configured to perform processes comprising:
   receiving a selection operation of a calculation function type;
   receiving an input operation of calculation object data according to the selected calculation function type;
   displaying the input calculation object data on the display;
   displaying calculation result data obtained by a calculation based on the input calculation object data on the display;
   receiving an output operation for outputting external data;
   converting at least one of the calculation object data and the calculation result data into a two-dimensional code according to (i) the selected calculation function type and (ii) both of an input state of the calculation object data and a display state of the calculation result data during the output operation; and
   outputting at least one of the calculation object data and the calculation result data as the external data.

2. The calculator according to claim 1, wherein the processor is configured to perform further processes comprising:
   in a case where the selected calculation function type is a matrix calculation function, receiving a matrix expression and element data thereof as the calculation object data;
   in a case of outputting the calculation object data outputting the calculation object data without the calculation result data after inputting the calculation object data and before displaying the calculation result data on the display; and
   in a case of outputting the calculation result data, outputting the calculation result data without the calculation object data after displaying the calculation result data on the display;
   wherein outputting the calculation object data and the calculation result data comprises displaying the calculation result data on the display.

3. The calculator according to claim 1, wherein the processor is configured to perform further processes comprising:
   in a case where the selected calculation function type is a statistic calculation function, receiving a statistic calculation type and statistic element data according to the statistic calculation type, as the calculation object data;

after inputting the calculation object data and before displaying the calculation result data on the display, outputting the calculation object data and the calculation result data; and after displaying the calculation result data on the display, outputting the calculation result data.

4. The calculator according to claim 1, wherein the processor is configured to perform further processes comprising:

in a case where the selected calculation function type is an equation calculation function, receiving an equation type and equation element data according to the equation type, as the calculation object data; and after displaying the calculation result data on the display, outputting the calculation object data and the calculation result data.

5. The calculator according to claim 1, wherein the processor is configured to perform further processes comprising:

displaying the two-dimensional code as an image on the display;

in a case where the output operation for outputting the external data is activated, outputting a symbol of the two-dimensional code to the display; and in a case where the output operation for outputting the external data is inactivated, not outputting the symbol of the two-dimensional code to the display.

6. A method performed by a calculator comprising a display and a processor, the method being executed by the processor, and the method comprising:

receiving a selection operation of a calculation function type;

receiving an input operation of calculation object data according to the selected calculation function type;

displaying the input calculation object data on the display;

displaying calculation result data obtained by a calculation based on the input calculation object data on the display;

receiving an output operation for outputting external data;

converting at least one of the calculation object data and the calculation result data into a two-dimensional code according to (i) the selected calculation function type and (ii) both of an input state of the calculation object data and a display state of the calculation result data during the output operation; and outputting at least one of the calculation object data and the calculation result data as the external data.

7. A method performed by a calculator comprising a display and a processor, the method being executed by the processor, and the method comprising:

receiving a selection operation of a calculation function type;

receiving an input operation of numerical value data as calculation object data according to the selected calculation function type;

displaying the input calculation object data on the display;

displaying calculation result data obtained by a calculation based on the input calculation object data on the display;

receiving an output operation for outputting external data;

generating the external data which includes the input numerical value data and calculation mode information representing the selected calculation function type;

converting the external data into a two-dimensional code; and outputting the converted two-dimensional code to the display.

* * * * *